(12) United States Patent
Westrick, Jr. et al.

(10) Patent No.: US 10,932,349 B1
(45) Date of Patent: Feb. 23, 2021

(54) LIGHTING CONTROL SYSTEM COMMISSIONING USING LIGHTING CONTROL SYSTEM SENSORS

(71) Applicant: ABL IP Holding LLC, Atlanta, GA (US)

(72) Inventors: Richard Lee Westrick, Jr., Social Circle, GA (US); Ryan Zaveruha, Stratford, CT (US); Frank Pelliccio, Gulford, CT (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/895,013

(22) Filed: Jun. 8, 2020

Related U.S. Application Data

(63) Continuation-in-part of application No. 16/571,674, filed on Sep. 16, 2019, now Pat. No. 10,694,606.

(51) Int. Cl.
*H05B 37/02* (2006.01)
*H05B 45/10* (2020.01)
(Continued)

(52) U.S. Cl.
CPC ............ *H05B 47/19* (2020.01); *H05B 47/11* (2020.01); *H05B 47/115* (2020.01); *H05B 47/16* (2020.01)

(58) Field of Classification Search
CPC ................ H05B 37/02; H05B 37/0227; H05B 37/0245; H05B 37/0263; H05B 37/0272; H05B 37/034; H05B 37/038; H05B 47/10; H05B 47/105; H05B 47/11; H05B 47/115; H05B 47/16; H05B 47/185; H05B 47/19
See application file for complete search history.

(56) References Cited

U.S. PATENT DOCUMENTS 8,228,184 B2 * 7/2012 Blakeley ............... G08B 29/181
340/539.1
9,137,879 B2 9/2015 Rains, Jr. et al.
(Continued)

OTHER PUBLICATIONS

U.S. Appl. No. 16/571,674, Ex Parte Quayle Action, Nov. 29, 2019, 6 pages.
(Continued)

*Primary Examiner* — Thai Pham
(74) *Attorney, Agent, or Firm* — Kilpatrick Townsend & Stockton LLP

(57) ABSTRACT

A method for configuring a wireless sensor of a lighting control network may include, providing, by a user, a sensor stimulus to cause the wireless sensor to wake-up from a reduced power operating mode. In the reduced power operating mode, a first radio configured to communicate using a first wireless communication protocol and a second radio configured to communicate using a second wireless communication protocol may be inoperative. The first radio may become operative upon the wake-up. The method may further include receiving, via the first radio, an activation message from a control device. The activation message may cause the wireless sensor to maintain operation of the first radio for a first specified period of time. The method may further include resuming, by the wireless sensor, operation in the reduced power operating mode after the first specified period of time. The wireless sensor may be a battery-powered wireless sensor.

24 Claims, 10 Drawing Sheets

(51) Int. Cl.
*H05B 47/19* (2020.01)
*H05B 47/16* (2020.01)
*H05B 47/11* (2020.01)
*H05B 47/115* (2020.01)

(56) References Cited

U.S. PATENT DOCUMENTS

| | | |
|---|---|---|
| 9,504,132 B2 | 11/2016 | Aggarwal et al. |
| 9,538,617 B2 | 1/2017 | Rains, Jr. et al. |
| 9,829,870 B2 | 11/2017 | Aggarwal et al. |
| 2008/0242314 A1* | 10/2008 | McFarland ............ G08C 17/02 455/456.1 |
| 2009/0066473 A1 | 3/2009 | Simons |
| 2009/0218951 A1 | 9/2009 | Weaver |
| 2009/0299527 A1 | 12/2009 | Huizenga et al. |
| 2010/0114340 A1 | 5/2010 | Huizenga et al. |
| 2014/0120961 A1* | 5/2014 | Buck ..................... H04W 4/12 455/466 |
| 2015/0296599 A1* | 10/2015 | Recker .................. H05B 47/19 315/153 |
| 2017/0123390 A1* | 5/2017 | Barco .................... G05B 15/02 |
| 2018/0114434 A1* | 4/2018 | Newman, Jr. .......... G05B 15/02 |

OTHER PUBLICATIONS

U.S. Appl. No. 16/571,674, Notice of Allowance, dated Feb. 20, 2020, 12 pages.

* cited by examiner

LIGHTING CONTROL SYSTEM COMMISSIONING USING LIGHTING CONTROL SYSTEM SENSORS

CROSS-REFERENCE TO RELATED APPLICATIONS

This Application is a continuation-in-part and claims priority to U.S. application Ser. No. 16/571,674 filed Sep. 16, 2019, and titled "LIGHTING CONTROL COMMISSIONING USING DISTRIBUTED OCCUPANCY SENSORS," the contents of which are herein incorporated in their entirety for all purposes.

BACKGROUND

Unless otherwise indicated herein, the materials described in this section are not prior art to the claims in this application and are not admitted to be prior art by inclusion in this section.

Lighting systems include lighting fixtures (e.g., luminaires), sensors (e.g., occupancy sensors), and lighting controllers. It is increasingly common for lighting fixtures to be equipped with individual occupancy sensors and control devices. These sensors and devices add to the complexity of system setup and programming, as each needs to be identified and grouped, for example by a technician, as part of programming the specified sequence of operations for the installation. With conventional software setup and programming methods for lighting systems, a user manually identifies and programs each control point to create lighting zones. Manually identifying and programming the control points takes considerable time and introduces opportunities for error.

In some cases, lighting systems may cause individual lighting fixtures to generate special coded light signals for use in conjunction with a mobile device to help a technician identify and program the lighting fixtures. However, the use of coded light signals requires special, and uncommon, capabilities of the driver and light engine in each lighting fixture. Other lighting systems use a custom laser "wand" that the technician uses to trigger light sensors in the lighting fixtures to identify and program them. The laser wand requires careful aiming to align the laser beam with the correct sensor in the lighting fixture. Additionally, the laser wand is a special piece of equipment that must be purchased and kept track of for future use. Often, initial set up (e.g., commissioning) of lighting fixtures and switches in a lighting installation is performed by a technician having little familiarity with the lighting control system. Thus, the commissioning procedure should be uncomplicated to minimize set up errors.

SUMMARY

Systems and methods for commissioning lighting control systems are provided.

According to various aspects there is provided a method for configuring a wireless sensor of a lighting control network. In some aspects, the method may include providing, by a user, a sensor stimulus to cause the wireless sensor to wake-up from a reduced power operating mode. In the reduced power operating mode, a first radio configured to communicate using a first wireless communication protocol and a second radio configured to communicate using a second wireless communication protocol may be inoperative. The first radio may become operative upon the wake-up. The method may further include receiving, via the first radio of the wireless sensor, an activation message from a control device. The activation message may cause the wireless sensor to maintain operation of the first radio for a first specified period of time. The method may further include resuming, by the wireless sensor, operation in the reduced power operating mode after the first specified period of time. The wireless sensor may be a battery-powered wireless sensor.

The method may further include receiving, via the first radio of the wireless sensor, configuration settings for the wireless sensor during the first specified period of time. The sensor stimulus may be motion detected by an occupancy sensor of the wireless sensor. The motion may be caused by a user moving in a detection field of the occupancy sensor. In some cases, the sensor stimulus may be a change in intensity level of light detected by a daylight sensor. The change in the intensity level of light may be caused by a user aiming a light-emitting device at the daylight sensor.

The control device may be a continuously powered wall station. Transmission of the activation message to the wireless sensor may be initiated by input to a user interface of the continuously powered wall station. In some cases, the control device may be a continuously powered sensor. Transmission of the activation message to the wireless sensor may be initiated by a command transmitted to the continuously powered sensor from a user device.

The activation message may be an indication included in an acknowledgement message received from the control device in response to a status message transmitted by the wireless sensor, or a message received from the control device in addition to an acknowledgement message received in response to a status message transmitted by the wireless sensor. The activation message may be a message received over a specified number of communication channels for the first radio of the wireless sensor. The activation message may include an instruction to cause the wireless sensor to activate the second radio for a second specified period of time. The second specified period of time may be shorter than the first specified period of time.

The method may further include receiving, via the second radio, network settings for use by the wireless sensor to communicate on the lighting control network; and receiving, via the first radio, configuration settings for the wireless sensor. The network settings may be received from a user device prior to receiving the configuration settings for the wireless sensor.

According to various aspects there is provided a lighting control network. In some aspects, the lighting control network may include a battery-powered wireless sensor configured to sense occupancy or light intensity level in a space, and a continuously powered control device in communication with the battery-powered wireless sensor. The battery-powered wireless sensor may be configured to wake-up from a reduced power operating mode in response to a sensor stimulus provided by a user. In the reduced power operating mode, a first radio configured to communicate using a first wireless communication protocol and a second radio configured to communicate using a second wireless communication protocol may be inoperative. The first radio may become operative upon the wake-up.

The battery-powered wireless sensor may be further configured to receive, via the first radio, an activation message from the continuously powered control device. The activation message may cause the battery-powered wireless sensor to maintain operation of the first radio for a first specified period of time. The battery-powered wireless sensor may be further configured to resume operation in the reduced power operating mode after the first specified period of time. The battery-powered wireless sensor may be further configured to receive, via the first radio, configuration settings for the battery-powered wireless sensor during the first specified period of time.

The sensor stimulus may be motion detected by an occupancy sensor of the battery-powered wireless sensor. The motion may be caused by a user moving in a detection field of the occupancy sensor. In some cases, the sensor stimulus may be a change in intensity level of light detected by a daylight sensor. The change in the intensity level of light may be caused by a user aiming a light-emitting device at the daylight sensor.

The continuously powered control device may be a continuously powered wall station. Transmission of the activation message to the battery-powered wireless sensor may be initiated by input to a user interface of the continuously powered wall station. In some cases, the continuously powered control device may be a continuously powered sensor. Transmission of the activation message to the battery-powered wireless sensor may be initiated by a command transmitted to the continuously powered sensor from a user device.

The activation message may be an indication included in an acknowledgement message received from the continuously powered control device in response to a status message transmitted by the battery-powered wireless sensor, or a message received from the continuously powered control device in addition to an acknowledgement message received in response to a status message transmitted by the battery-powered wireless sensor. The activation message may be a message received over a specified number of communication channels for the first radio of the battery-powered wireless sensor. The activation message may include an instruction to cause the battery-powered wireless sensor to activate the second radio for a second specified period of time. The second specified period of time may be shorter than the first specified period of time.

The battery-powered wireless sensor may be further configured to receive, via the second radio, network settings for use by the battery-powered wireless sensor to communicate on the lighting control network, and receive, via the first radio, configuration settings for the battery-powered wireless sensor. The network settings may be received from a user device prior to receiving the configuration settings for the battery-powered wireless sensor.

Numerous benefits are achieved by way of the various embodiments over conventional techniques. For example, the various embodiments provide systems and methods that can be used to simplify commissioning and updating the settings of battery-powered wireless sensors for lighting control systems. Battery-powered wireless sensors may be installed in difficult to access locations (e.g., ceilings of high-bay areas). The battery-powered wireless sensors may operate in a reduced power mode for portions of time, and "wake-up" to receive communications. In some embodiments, the battery-powered wireless sensors may be awakened by sensing motion of a technician. In other embodiments, the sensors may be awakened by sensing a change in ambient light produced by a flashlight beam. Remotely waking the sensors can eliminate a need to physically access the sensors to wake-up the sensors and enable a communication mode. These and other embodiments along with many of the advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

Figure 1A:
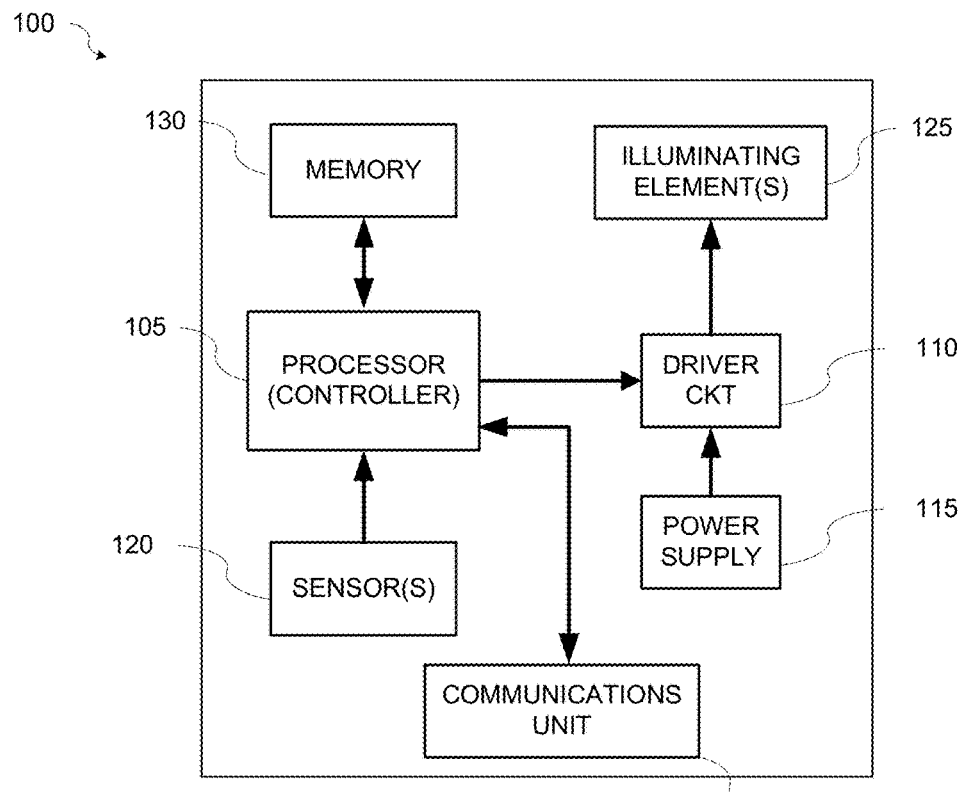
FIG. 1A is a block diagram of an example of a light fixture according to aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

A lighting control system may include, among other things, devices such as light fixtures, sensors (e.g., occupancy sensors or other sensors), wall stations (e.g., switches or other control devices), and a central controller or distributed controllers embedded in the devices. The sensors may also be centralized (e.g., one sensor mounted in a space to sense motion for a group of light fixtures) or distributed (e.g., embedded in the light fixtures and/or control devices). Initial setup, also referred to herein as commissioning, of the lighting control system involves associating light fixtures with control devices to form lighting groups. For example, light fixtures located in a particular room should be associated with control devices, for example wall stations and/or sensors, located in the same room. In addition, the initial set up should exclude light fixtures and/or control devices that should not be part of a defined lighting group, for example light fixtures and control devices in another room or floor, particularly with a wireless lighting control system. For example, signals from a wireless radio frequency (RF) lighting control system can penetrate walls and so can cause light fixtures and/or control devices in adjacent rooms and/or floors to unintentionally become part of a lighting group.

Both wired and wireless lighting control systems can present difficulties when trying to identify devices to be included in in lighting groups. For example, in a digital addressable lighting interface (DALI) control system, two-wire control wiring is installed along with the power wiring for each device. Light fixtures and control devices (e.g., wall stations) have addresses and so can communicate individually over a network. In some implementations, switches can be on one network and light fixtures on another network. The two networks may be associated through a central controller. Thus, the networks can span different rooms upon installation. There may be no association between the physical wiring and the networks to which wall stations and light fixtures belong. In some cases, wall stations and fixtures on different networks may need to be part of same logical grouping (i.e., lighting group). With wireless lighting control systems, the lighting groups are formed by wireless communication between the devices. Each individual wireless device (e.g., light fixtures, wall stations, sensors, etc.) is associated with a particular lighting group based on for example, an IP address, MAC address, or other network address or identifier, by responding to a broadcast message from one of the devices (e.g., a wall station). Thus, with both wired and wireless lighting control system, forming lighting groups during initial set up, or commissioning, may be difficult, in particular when commissioning of the lighting control system is performed by a technician having little or no experience with a particular lighting control system.

FIG. 1A is a block diagram of a light fixture 100 according to aspects of the present disclosure. Referring to FIG. 1A, the light fixture 100 may include an embedded controller or processor 105, driver circuitry 110, a power supply 115, one or more sensors 120, one or more illuminating element(s) 125, a memory 130, and a communications unit 135. The embedded controller or processor 105 may control overall operation of the light fixture 100. The embedded controller or processor 105 may be a microprocessor, microcomputer, computer, microcontroller, programmable controller, or other programmable device. The embedded controller or processor 105 may be part of a distributed lighting control network in which the controllers in each device communicate with each other without involvement of a central lighting controller. Alternatively, the embedded controller or processor 105 may communicate with a central lighting controller as part of a centrally controlled lighting control system.

The embedded controller or processor 105 may communicate with a memory 130. The memory 130 may be processor-readable solid state storage media, for example, but not limited to, RAM, ROM, EEPROM, FLASH memory, or other solid state storage devices that may be used to store desired program code in the form of instructions or data structures and that may be accessed by and/or operated upon by the embedded controller or processor 105.

The power supply 115 may supply power for the illuminating element(s) 125. The power supply 115 may be, for example, an AC-DC converter, a DC-DC converter, or an AC-AC converter. The power supply 115 may be included within a housing of the light fixture 100 or may be external to the light fixture 100. The embedded controller or processor 105 may provide control signals to the driver circuitry 110 to control the illumination characteristics of the illuminating element(s) 125. For example, the embedded controller or processor 105 may receive lighting control protocol input signals such as DMX512, DALI, ZIGBEE, Bluetooth® or other lighting control protocol and based on the input signals, generate the control signals to the driver circuitry 110. The driver circuitry 110 may control the power provided to the illuminating element(s) 125 from the power supply 115. In some implementations, the driver circuitry 110 and/or driver functions may be incorporated into the power supply 115 and the embedded controller or processor 105 may provide control signals to the power supply 115. Based on instructions received from the embedded controller or processor 105, the driver circuitry 110 may control lighting characteristics, for example, but not limited to, intensity, color temperature, color of light, or other lighting characteristic, produced by the illuminating element(s) 125. The illuminating element(s) 125 may be a light-emitting diode (LED), organic LED (OLED), a tunable fluorescent lamp, and/or other light emitting device(s).

The one or more sensors 120 may sense the motion of an occupant in the vicinity of the light fixture 100, for example in a room monitored by the one or more sensors 120. The one or more sensors 120 may include an occupancy sensor, for example, but not limited to, passive infrared (PIR) sensors, radar sensors, "time of flight" (TOF) sensors, (e.g., laser, radio, acoustic, etc.), and ultra-wideband (UWB) sensors. PIR sensors detect infrared radiation (i.e., radiant heat) emitted by or reflected from objects in their field of view. Doppler radar based occupancy sensors transmit a known continuous wave frequency and continuously detect reflections from objects within their field. TOF sensors measure the distance between the sensor and an object based on the time difference between the emission of the signal (e.g., an optical or acoustic signal) and its return to the sensor after being reflected by the object. UWB sensors use impulse radar techniques for emitting and sampling signal pulses to achieve accurate distance measurements determined by the time differences between transmitted and received pulses.

Other sensors that may be used include infrared (IR) sensors, ultrasonic sensors, audio sensor arrays, distance-based photoelectric sensors, radio frequency identification (RFID) tag readers, near field communication (NFC) tag readers, a Bluetooth® radio, a WiFi® radio from a mobile device carried by the occupant, or other ranging technology sensors capable of detecting the presence of an occupant near the light fixture and/or the distance of an occupant from the light fixture, or combinations thereof. In some implementations, these sensors may only detect motion or whether any occupant is near the fixture, while in other implementations the sensors may have sufficient resolution to be capable of detecting the number occupants within range of the sensor. Other variations of the light fixture 100 may be implemented without departing from the scope of the present disclosure. In some implementations, for example when a centralized sensor mounted on a wall or ceiling (i.e., one sensor communicating with the other devices of a lighting group in a room or other space) is used, the light fixture may not include one or more of the sensors 120 or one or more of the sensors included in the light fixture may be unused.

The communications unit 135 may enable the light fixture to communicate via a wired or wireless network. The communications unit 135 may represent one or more components that facilitate a network connection. In some implementations, the communications unit 135 may be a wireless communication device and can include wireless interfaces such as IEEE 802.11, Bluetooth, or other radio interfaces for accessing cellular telephone networks (e.g., transceiver/antenna for accessing a CDMA, GSM, UMTS, or other mobile communications network). In other implementations, the communication unit 135 may include a wired communication device and can include interfaces such as Ethernet, EIA RS-485, USB, IEEE 1394, or a fiber optic interface. In still other implementations, the communications unit 135 may include both wireless and wired communication devices.

A wall station may provide control functions, for example, but not limited to, on-off switching, dimming, color control, etc., for light fixtures in a lighting group. Commands (e.g., on/off, dim, etc.) for a lighting group may be received via the wall station. In some implementations, commands received by the wall station may be transmitted to a central lighting controller and the central lighting controller may communicate the commands wirelessly or over a wired connection to embedded controllers in the light fixtures of the lighting group. The central lighting controller may associate light fixtures on different networks with one lighting group and transmit the commands accordingly. In some implementations without a central lighting controller, an embedded controller in the wall station may communicate the commands to embedded controllers in the light fixtures of the lighting group.

Figure 1B:
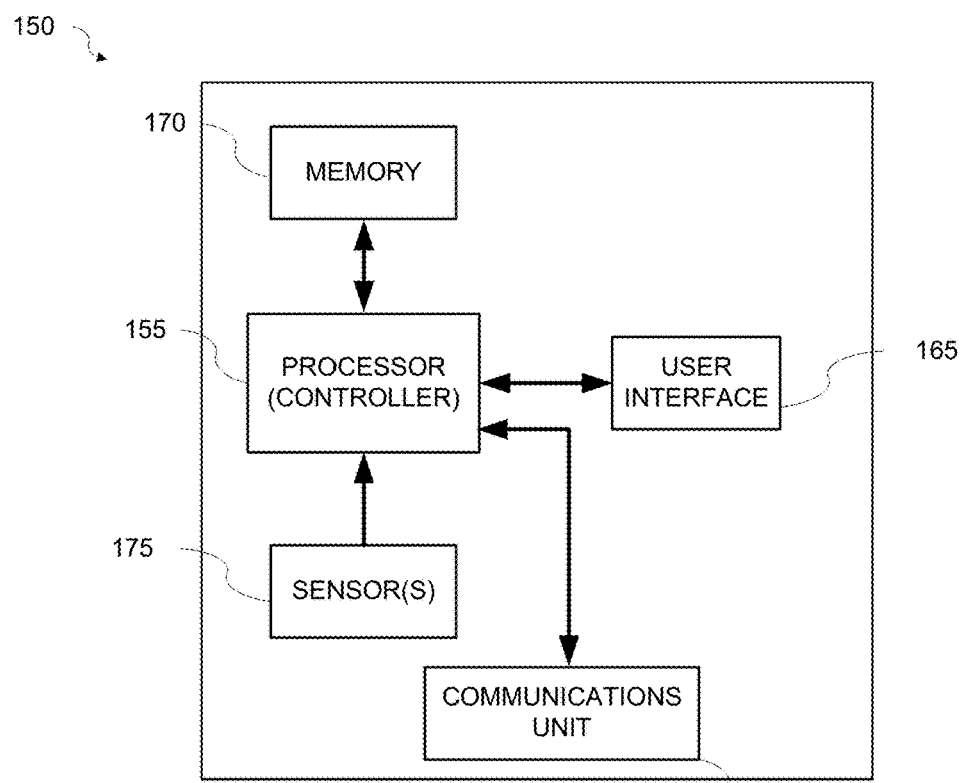
FIG. 1B is a block diagram of an example of a wall station according to aspects of the present disclosure.

FIG. 1B is a block diagram of an example of a wall station 150 according to various aspects of the present disclosure. The wall station 150 may include an embedded controller or processor 155 and/or may communicate wirelessly or over a wired connection via a communications unit 160 with a central lighting controller and/or light fixtures and/or sensors in a lighting group. The wall station 150 may also provide programmable functionality (e.g., setting light levels, programming on-off times, etc.) for the devices in a lighting group, for example via communication with a central controller or the embedded controller or processor 155 of the wall station 150.

The embedded controller or processor 155 may be a microprocessor, microcomputer, computer, microcontroller, programmable controller, or other programmable device. The embedded controller or processor 155 may be part of a distributed lighting control network in which the controllers in each device communicate with each other without involvement of a central lighting controller. Alternatively, the embedded controller or processor 155 may communicate with a central lighting controller as part of a centrally controlled lighting control system. The embedded controller or processor 155 may communicate with a memory 170. The memory 170 may be processor-readable solid state storage media, for example, but not limited to, RAM, ROM, EEPROM, FLASH memory, or other solid state storage devices that may be used to store desired program code in the form of instructions or data structures and that may be accessed by and/or operated upon by the embedded controller or processor 155.

The wall station 150 may include a user interface 165, for example, one or more buttons on a keypad and/or a touch screen or other user interface, to enable a user to input commands for controlling a lighting group. In some implementations, a software application, for example an application executing on a mobile device, may be operable to communicate with the wall station 150 to input commands to the wall station 150. In some implementations, the wall station 150 may include one or more sensors 175, for example, but not limited to, occupancy sensors, light sensors, etc.

Figure 2:
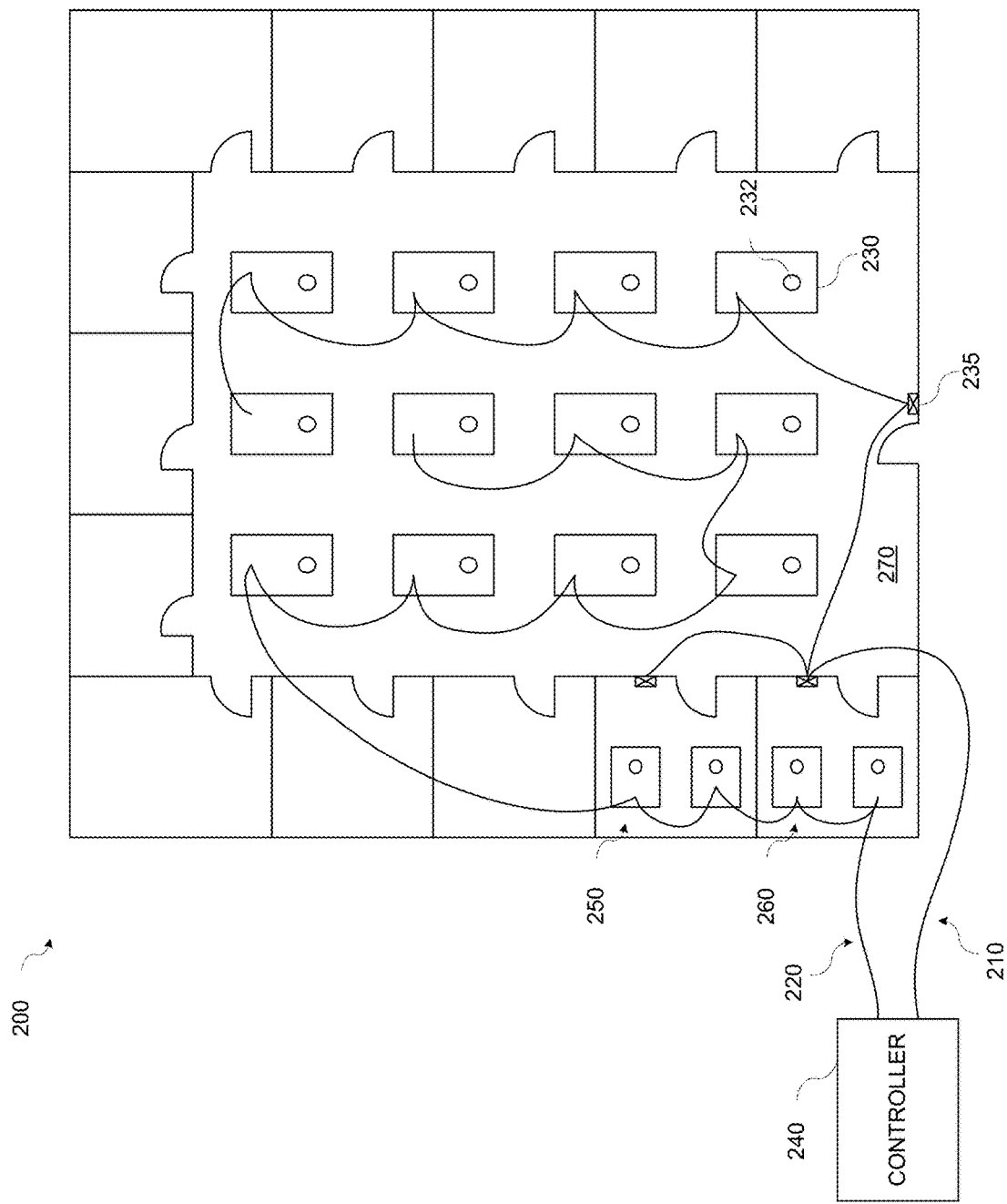
FIG. 2 is a diagram illustrating an example of a lighting control system having a centralized architecture and using distributed sensors according to aspects of the present disclosure.

In some embodiments, a lighting control system may be implemented with a centralized architecture. FIG. 2 is a diagram illustrating an example of a lighting control system 200 having a centralized architecture and using distributed sensors according to aspects of the present disclosure. In a centralized architecture, a central controller may communicate with and control the lighting fixtures, sensors, and wall stations in the lighting installation. FIG. 2 illustrates an example of wired groupings of light fixtures and wall stations in an office lighting installation with open office space surrounded by private offices.

The lighting installation may include more than one network 210, 220 of devices (e.g., light fixtures 230, occupancy sensors 232, wall stations 235, etc.). The networks 210, 220 in the centralized architecture may be wired networks. In a wired implementation, the devices in each network 210, 220 may be wired to a central controller 240, and communication between the central controller and each device may be via the wired connections. Each device may have a network address or other identifier to identify the device on the network. In some cases, the occupancy sensors 232 may be distributed in the light fixtures 230, with each light fixture 230 having its own embedded occupancy sensor 232 to detect motion in the vicinity of the light fixture 230 and provide a motion detection signal to the central controller 240. For example, when the embedded occupancy sensor 232 detects motion of a person near the light fixture 230, the embedded occupancy sensor 232 may generate a signal to the embedded controller or processor (e.g., the controller or processor 105) of the light fixture 230, and the embedded processor may cause the communications unit (e.g., the communications unit 160) to transmit a signal to the central controller 240. The embedded occupancy sensors 232 may be, for example, but not limited to, PIR sensors, ultrasonic sensors, high frequency RF sensors (e.g., UWB, TOF, etc.) or other occupancy sensors.

In some implementations, the central controller may connect two or more networks enabling devices on the different networks to communicate with one another. For example, one or more wall stations 235 (e.g., switches) may be connected to a first network 210 while lighting fixtures 230 and/or sensors 232 may be connected to a second network 220. The central controller 240 may enable connecting the wall stations on the first network 210, for example wall stations in different rooms, to control specified lighting fixtures on the second network 220 located in the corresponding rooms. Any combination of wall stations, light fixtures, and/or sensors may be connected to a network.

The centralized controller may be a physical device located on premise with the lighting control system, or may be a software implementation which is hosted on a remote data center or cloud computing platform such as AWS, Azure, etc., or may be a combination thereof. Similarly, the centralized controller functionality may be implemented across many smaller devices configured as a distributed computing platform, as described, for example, in one or more of U.S. Pat. Nos. 9,538,617, 9,829,870, 9,137,879, and 9,504,132.

In accordance with various aspects of the present disclosure, the distributed occupancy sensors in the lighting control system can be used to simplify the commissioning process by detecting the motion of a technician passing under a light fixture, and based on the detected motion, adding the light fixture to a specified lighting group. Referring to the example of FIG. 2, during commissioning, three lighting groups may be formed: one lighting group for a first private office 250, one lighting group for a second private office 260, and one lighting group for the open office space 270. A lighting group may be formed by commanding devices on the one or more networks of the lighting control system into a pairing mode.

While in pairing mode, devices (e.g., light fixtures) may be selected to form a lighting group using the embedded sensors (e.g., occupancy sensors) to detect motion of a person passing by the devices. In some implementations, the processor or embedded controller of the light fixture or the central controller may change the light intensity emitted by the light fixture to a first level when in pairing mode and change the light intensity to a second level when the light fixture is selected to join a lighting group. The processor or embedded controller of the light fixture or the central controller may cause the light fixture to signal that it has been selected by causing various changes in the light intensity emitted by the light fixture, for example, but not limited to, increasing intensity, decreasing intensity, blinking, changing color, or providing another visual or audible indication. Any of the various changes in light intensity may be used to indicate the first light intensity level or the second light intensity level.

Figure 3:
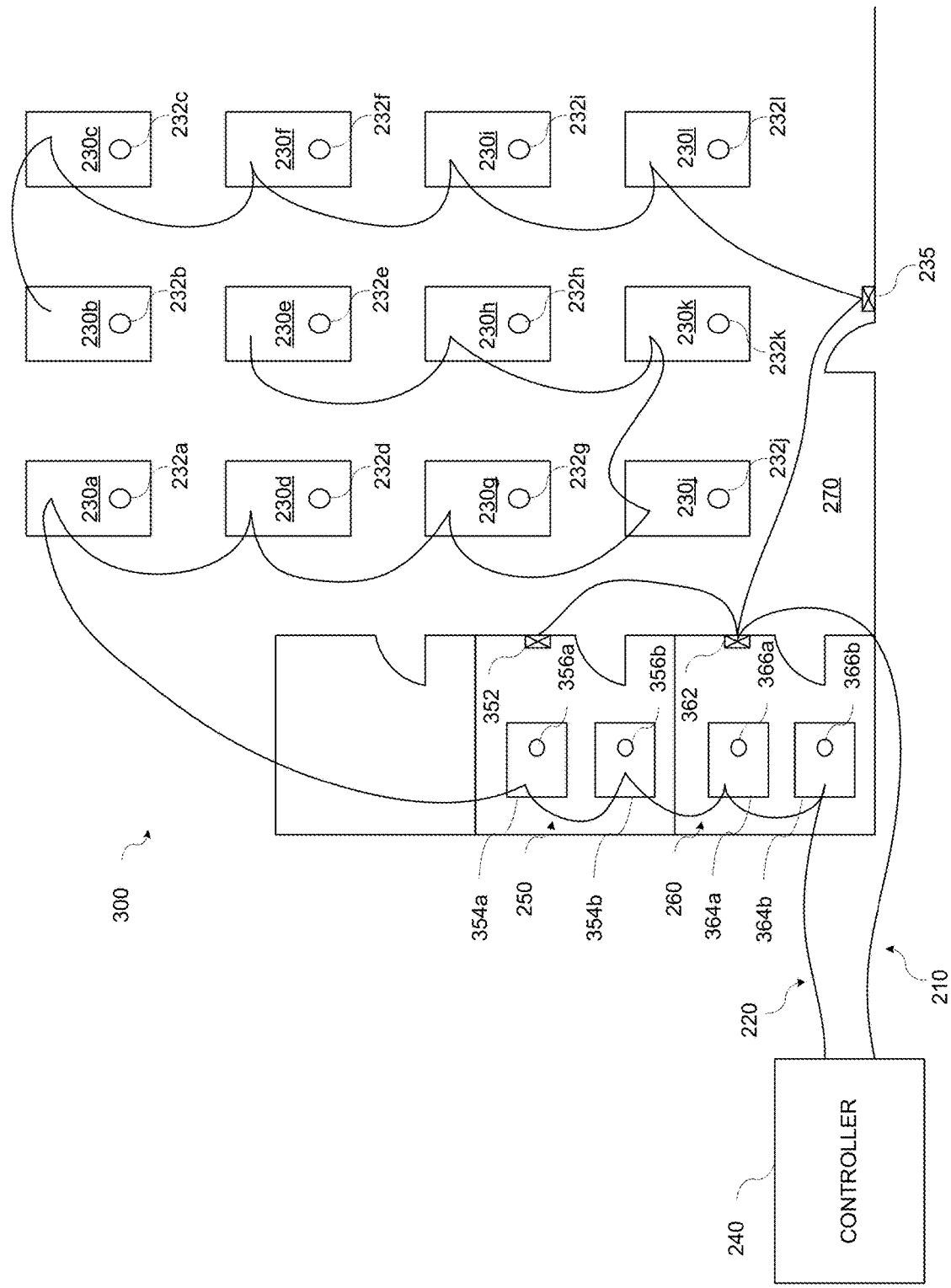
FIG. 3 is a diagram illustrating additional details of the example lighting control system of FIG. 2 according to aspects of the present disclosure.

FIG. 3 is a diagram illustrating additional details of the lighting control system of FIG. 2 according to aspects of the present disclosure. As illustrated in FIG. 3, light fixtures 230*b*, 230*c*, 230*f*, 230*i*, and 230*l*, and wall stations 235, 352, and 362 may be connected to the first network 210. Light fixtures 354*a*, 354*b*, 364*a*, 364*b*, 230*a*, 230*d*, 230*e*, 230*g*, 230*h*, 230*j*, and 230*k* may be connected to the second network 220. The light fixtures may include embedded occupancy sensors 232*a*-232*l*. Devices on the first network 210 and the second network 220 may be associated by the central controller 240.

In the example lighting installation shown in FIG. 3, lighting groups controlled by wall stations may be formed by commanding the devices in the lighting control system network(s) into a pairing mode. The devices may be commanded into the pairing mode using the control device, in this case the wall station that will control the lighting group. A technician may use a wall station to command the networked devices into pairing mode by, for example, a specified sequence of button presses, a selection on a touch screen display, a software application executing on a mobile device, or another method of interfacing with the wall station. The command entered via the wall station may be transmitted to the central controller 240, and the central controller may transmit signals to the devices to command them into the pairing mode. Other methods of commanding the devices into pairing mode with the first wall station may be used, for example a software application executing on a mobile device in communication with the first wall station, without departing from the scope of the present disclosure. In some implementations, a user may input commands to a user interface (not shown) of the central controller 202 to cause the central controller 240 to command the devices connected to a specified network into pairing mode.

When in pairing mode, sensitivity of the embedded sensors (e.g., occupancy sensors) in the devices (e.g., light fixtures) may be reduced such that motion of a person may be detected only in the immediate vicinity, for example directly beneath, a light fixture. In some implementations, wall stations may also include embedded sensors such as occupancy sensors. In these implementations, the sensitivity of the sensors may be reduced such that the motion of a person directly in front of the wall station may be detected. Devices (e.g., light fixtures and/or wall stations) to be associated with the lighting group may then be selected by an occupant, for example a technician performing the commissioning of the lighting control system, moving beneath the desired light fixtures and in front of desired wall stations. In cases where a wall station does not include a sensor, the wall station may be selected as part of the lighting group using one or more button presses, a selection on a touchscreen display, or other means of interfacing with the wall station. Pairing mode may be exited by a second specified sequence of button presses, a selection on a touch screen display of the wall station, or other means of interfacing with the wall station from which pairing mode was entered. For lighting installations in which devices for one lighting group are connected to more than one network, the central controller may enable the association of the devices on the different networks with the lighting group.

Referring to the example of FIG. 3, three lighting groups may be formed: a first lighting group for the first private office 250, a second lighting group for the second private office 260, and a third lighting group for the open office space 270. To form the first lighting group for the first private office 250, the technician may enter a specified sequence of button presses or a selection on a touch screen display of a first wall station 352 to command all the devices on the first network 210 and the second network 220 into pairing mode. For example, the specified sequence of button presses or a selection on the touch screen display on the first wall station 352 may transmit a signal to the central controller 240 indicating that the devices in the lighting control system should be commanded into pairing mode. A processor or embedded controller of the first wall station 352 may cause a communications unit of the first wall station 352 to transmit a signal to the central controller 240. The transmitted signal from the first wall station 352 may include a network address or other identifier of the first wall station 352. The central controller 240 may associate the network address or other identifier of the first wall station 352 with an identifier of a first lighting group and may issue commands to the devices via the first network 210 and the second network 220 to cause the devices to enter pairing mode.

Entering pairing mode may cause the sensitivity of the sensors embedded in the light fixtures and/or wall stations connected to both networks to be reduced. In addition, the light intensity emitted by the light fixtures may change to a different level (e.g., increase intensity, decrease intensity, blink, change color, or another visual indication) from its current level to indicate that the light fixtures are in pairing mode. For example, the central controller 240 may transmit a signal to the processor or controller in each light fixture to cause the processor or controller in the light fixture to decrease the light intensity. In the private office 250, the sensitivity of the sensors (e.g., occupancy sensors) 356*a* and 356*b* embedded in light fixtures 354*a* and 354*b*, respectively, may be reduced. The technician may then walk beneath light fixture 354*a*. The motion of the technician may be detected by the sensor 356*a* embedded in the light fixture 354*a*. Since the sensitivity of the sensors 356*a* and 356*b* is reduced in pairing mode, only the sensor 356*a* embedded in the light fixture 354*a* may detect the motion of the technician. Alternatively, the sensor may use the proximity of the technician to the fixture (if capable of determining distance)

and a specified range based on the size and type of the fixture to determine when the technician is under the light fixture.

A signal indicating the detection may be transmitted to the central controller 240 from the light fixture 354a. For example, a processor or embedded controller of the light fixture 354a may cause a communications unit of the light fixture 354a to transmit a signal to the central controller 240. Based on the received signal, the central controller may associate the light fixture 354a with the first wall station 352 as part of the first lighting group. The detection signal may include an identifier (e.g., a network address or other identifier) of the light fixture 354a. The central controller 240 may associate network addresses or other identifiers of the first wall station 352 and the light fixture 354a with an identifier (e.g., an identification number) of the first lighting group.

When the light fixture 354a is associated with the first lighting group, the light intensity emitted by the light fixture 354a may change (e.g., increase intensity, decrease intensity, blink, change color, or another visual indication) from its current level to indicate the association. For example, the central controller 240 may transmit a signal to the processor or controller in the light fixture 354a to cause the processor or controller in the light fixture to increase the light intensity.

The technician may then walk beneath light fixture 354b. The motion of the technician may be detected by the sensor 356b embedded in the light fixture 354b. Since the sensitivity of the sensors 356a and 356b is reduced in pairing mode, only the sensor 356b embedded in the light fixture 354b may detect the motion of the technician. Alternatively, the sensor may use the proximity of the technician to the fixture (if capable of determining distance) and a specified range based on the size and type of the fixture to determine when the technician is under the light fixture. A signal indicating the detection may be transmitted to the central controller 240 from the light fixture 354b. For example, a processor or embedded controller of the light fixture 354b may cause a communications unit of the light fixture 354b to transmit a signal to the central controller 240. Based on the received signal, the central controller 240 may associate the light fixture 354b with the first wall station 352 as part of the first lighting group. The detection signal may include an identifier (e.g., a network address or other identifier) of the light fixture 364a. The central controller 240 may associate network addresses or other identifiers of the wall station 352 and the light fixture 354b with an identifier (e.g., an identification number) of the first lighting group.

When the light fixture 354b is associated with the first lighting group, the light intensity emitted by the light fixture 354b may change (e.g., increase intensity, decrease intensity, blink, change color, or another visual indication) from its current level to indicate the association. For example, the central controller 240 may transmit a signal to the processor or controller in the light fixture 354b to cause the processor or controller in the light fixture to increase the light intensity. The technician may then return to the first wall station 352 and enter a second specified sequence of button presses or a selection on a touch screen display or otherwise interact with the first wall station 352 to cause the first wall station 352 to transmit an exit signal to the central controller 240. The central controller 240 may transmit signals to the devices on the first network 210 and the second network 220 to cause the devices to exit the pairing mode. The signals transmitted by the central controller 240 may cause the embedded controller or processor of each light fixture to change (e.g., increase intensity, decrease intensity, blink, change color, or another visual indication) the light intensity levels of the light fixtures from their current levels upon exiting the pairing mode.

Once a device has been paired, it will not enter pairing mode again during the commissioning process unless the device receives a specified command issued from the central controller or associated wall station. Devices may be disassociated from their lighting groups, for example, by specified commands issued from the central controller or associated wall station and again be available for pairing.

A second lighting group for the second private office 260 may be formed by the technician entering a specified sequence of button presses or a selection on a touch screen display of a second wall station 362 to command all the devices on the first network 210 and the second network 220 into pairing mode. For example, the specified sequence of button presses or a selection on the touch screen display on the second wall station 362 may transmit a signal to the central controller 240 indicating that the devices in the lighting control system should be commanded into pairing mode. A processor or embedded controller of the second wall station 362 may cause a communications unit of the second wall station 362 to transmit a signal to the central controller 240. The transmitted signal from the second wall station 362 may include a network address or other identifier of the second wall station 362. The central controller 240 may associate the network address or other identifier of the second wall station 362 with a second lighting group and may issue commands to the devices via the first network 210 and the second network 220 to cause the devices to enter pairing mode. As noted above, the first wall station 352 and the light fixtures 354a and 354b will not enter pairing mode since they have already been paired.

Entering pairing mode may cause the sensitivity of the sensors embedded in the light fixtures and/or wall stations connected to both networks to be reduced. In addition, the light intensity emitted by the light fixtures may change to a different level (e.g., increase intensity, decrease intensity, blink, change color, or another visual indication) from its current level to indicate that the light fixtures are in pairing mode. In the private office 260, the sensitivity of the sensors (e.g., occupancy sensors) 366a and 366b embedded in light fixtures 364a and 364b, respectively, may be reduced. The technician may then walk beneath light fixture 364a. The motion of the technician may be detected by the sensor 366a embedded in the light fixture 364a. Since the sensitivity of the sensors 366a and 366b is reduced in pairing mode, only the sensor 366a embedded in the light fixture 364a may detect the motion of the technician. Alternatively, the sensor may use the proximity of the technician to the fixture (if capable of determining distance) and a specified range based on the size and type of the fixture to determine when the technician is under the light fixture.

A signal indicating the detection may be transmitted to the central controller 240 from the light fixture 364a. For example, a processor or embedded controller of the light fixture 364a may cause a communications unit of the light fixture 364a to transmit a signal to the central controller 240. Based on the received signal, the central controller may associate the light fixture 364a with the second wall station 362 as part of the second lighting group. The detection signal may include an identifier (e.g., a network address or other identifier) of the light fixture 364a. The central controller 240 may associate network addresses or other identifiers of the second wall station 362 and the light fixture 364b with an identifier (e.g., an identification number) of the second lighting group. When the light fixture 364a is associated with the second lighting group, the light intensity emitted by the light fixture 364a may change to a different level (e.g., increase intensity, decrease intensity, blink, change color, or another visual indication) from its current level to indicate the association. For example, the central controller 240 may transmit a signal to the processor or controller in the light fixture 364a to cause the processor or controller in the light fixture to increase the light intensity.

The technician may then walk beneath light fixture 364b. The motion of the technician may be detected by the sensor 366b embedded in the light fixture 364b. Since the sensitivity of the sensors 366a and 366b is reduced in pairing mode, only the sensor 366b embedded in the light fixture 364b may detect the motion of the technician. Alternatively, the sensor may use the proximity of the technician to the fixture (if capable of determining distance) and a specified range based on the size and type of the fixture to determine when the technician is under the light fixture. A signal indicating the detection may be transmitted to the central controller 240 from the light fixture 364b. For example, a processor or embedded controller of the light fixture 364b may cause a communications unit of the light fixture 364b to transmit a signal to the central controller 240. Based on the received signal, the central controller may associate the light fixture 364b with the wall station 362 as part of the first lighting group. The detection signal may include an identifier (e.g., a network address or other identifier) of the light fixture 364b. The central controller 240 may associate network addresses or other identifiers of the second wall station 362 and the light fixture 364b with an identifier (e.g., an identification number) of the second lighting group.

When the light fixture 364b is associated with the second lighting group, the light intensity emitted by the light fixture 364b may change to a different level (e.g., increase intensity, decrease intensity, blink, change color, or another visual indication) from its current level to indicate the association. For example, the central controller 240 may transmit a signal to the processor or controller in the light fixture 364b to cause the processor or controller in the light fixture to increase the light intensity. The technician may then return to the second wall station 362 and enter a second specified sequence of button presses or a selection on a touch screen display or otherwise interact with the second wall station 362 to cause the second wall station 362 to transmit an exit signal to the central controller 240. The central controller 240 may transmit signals to the devices on the first network 210 and the second network 220 to cause the devices to exit the pairing mode. The signals transmitted by the central controller 240 may cause the embedded controller or processor of each light fixture to change the light intensity levels of the light fixtures to different levels (e.g., increase intensity, decrease intensity, blink, change color, or another visual indication) from their current levels upon exiting the pairing mode.

A third lighting group for the open office space 270 may be formed by the technician entering a specified sequence of button presses or a selection on a touch screen display of a third wall station 235 to command all the devices on the first network 210 and the second network 220 into pairing mode. For example, the specified sequence of button presses or a selection on the touch screen display on the third wall station 235 may transmit a signal to the central controller 240 indicating that the devices in the lighting control system should be commanded into pairing mode. A processor or embedded controller of the third wall station 235 may cause a communications unit of the third wall station 235 to transmit a signal to the central controller 240. The transmitted signal from the third wall station 235 may include a network address or other identifier of the third wall station 235. The central controller 240 may associate the network address or other identifier of the third wall station 235 with a third lighting group and may issue commands to the devices via the first network 210 and the second network 220 to cause the devices to enter pairing mode. As noted above, the first wall station 352, the second wall station 362, and the light fixtures 354a, 354b, 364a, and 364b will not enter pairing mode since they have already been paired.

Entering pairing mode may cause the sensitivity of the sensors embedded in the light fixtures and/or wall stations connected to both networks to be reduced. In addition, the light intensity emitted by the light fixtures may change to different levels (e.g., increase intensity, decrease intensity, blink, change color, or another visual indication) from their current levels to indicate that the light fixtures are in pairing mode. In the open office space 270, the sensitivity of the sensors (e.g., occupancy sensors) 332a-332l embedded in light fixtures 330a-330l, respectively, may be reduced. The technician may then walk beneath each light fixture 330a-330l. The motion of the technician may be detected by the sensors 332a-332l embedded in the light fixtures 330a-330l as the technician passes beneath each light fixture 330a-330l. Since the sensitivity of the sensors 332a-332l is reduced in pairing mode, only the sensor embedded in the light fixture beneath which the technician passes may detect the motion of the technician. Alternatively, the sensors may use the proximity of the technician to the fixture (if capable of determining distance) and a specified range based on the size and type of the fixture to determine when the technician is under the light fixtures.

A signal indicating the detection may be transmitted from each of the light fixtures 330a-330l to the central controller 240. Processors or embedded controllers of each of the light fixtures 330a-330l may cause respective communications units to transmit signals to the central controller 240. Based on the received signals, the central controller may associate each of the light fixtures 330a-330l with the third wall station 235 as part of the third lighting group. The detection signals may include identifiers (e.g., network addresses or other identifier) of the light fixtures 330a-330l. The central controller 240 may associate network addresses or other identifiers of the third wall station 235 and the light fixtures 330a-330l with an identifier (e.g., an identification number) of the third lighting group. As the light fixtures 330a-330l are associated with the third lighting group, the light intensity emitted by each light fixture 330a-330l may change to a different level (e.g., increase intensity, decrease intensity, blink, change color, or another visual indication) from its current level to indicate the association. For example, the central controller 240 may transmit a signal to the processor or controller in each light fixture 330a-330l to cause the processor or controller in the light fixture to increase the light intensity.

The technician may then return to the third wall station 235 and enter a second specified sequence of button presses or a selection on a touch screen display or otherwise interact with the third wall station 235 to cause the third wall station 235 to transmit an exit signal to the central controller 240. The central controller 240 may transmit signals to the devices on the first network 210 and the second network 220 to cause the devices to exit the pairing mode. The signals transmitted by the central controller 240 may cause the embedded controller or processor of each light fixture to change the light intensity levels of the light fixtures to different levels (e.g., increase intensity, decrease intensity, blink, change color, or another visual indication) from their current levels upon exiting the pairing mode.

While the above example is explained using three lighting groups, it should be appreciated that any number of lighting groups may be formed during commissioning of a lighting control system as explained by the example without departing from the scope of the present disclosure.

In some embodiments, a lighting control system implemented with a centralized architecture may use a centralized occupancy sensor rather than distributed sensors embedded in the light fixtures. A centralized occupancy sensor, for example, an ultrasonic sensor, a high-frequency radio frequency (RF) sensor, etc., may be mounted on a wall or ceiling to sense motion for multiple light fixtures, for example all the light fixtures in one room. The centralized occupancy sensor may be a "directionally aware" sensor. A directionally aware sensor may be capable of determining a direction and/or location from which motion is detected and may enable multiple lighting groups to be defined within a large space using the one occupancy sensor for each lighting group. The centralized occupancy sensor may sense motion in the room around each of the light fixtures and provide a motion detection signal to the central controller.

A directionally aware centralized occupancy sensor can differentiate between the location of motion occurring in the room in which it is mounted and motion that is not occurring in the room. For example, high-frequency RF sensors (e.g., ultra-wideband (UWB), time-of-flight (TOF), etc.) have some ability to penetrate walls, but also provide low resolution images of objects within its field of view enabling the use of signal processing to detect the location of objects such as light fixtures as well as to detect where motion occurs. Ultrasonic sensors may also determine a location of motion within a room.

Figure 4:
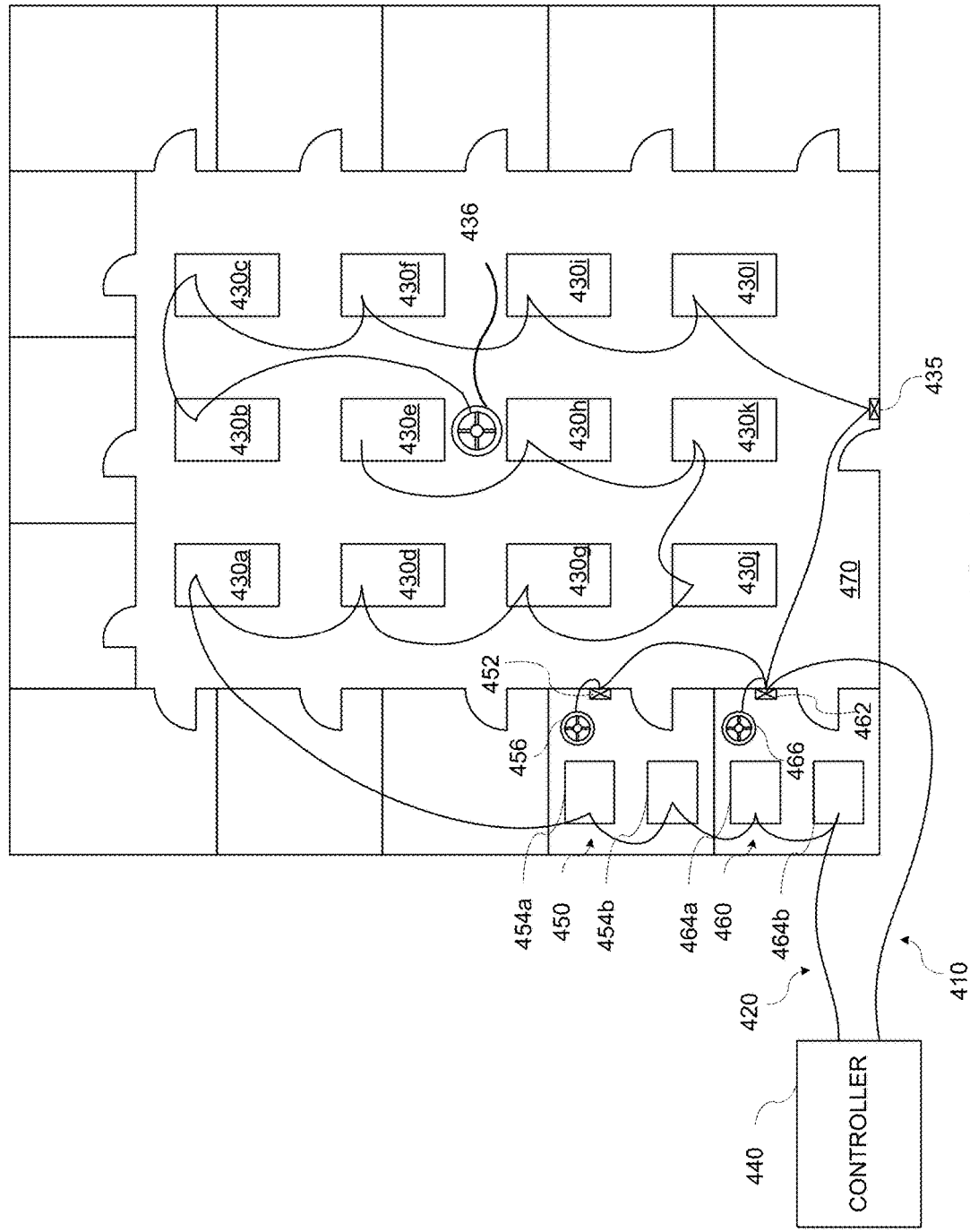
FIG. 4 is a diagram illustrating an example of a lighting control system having a centralized architecture and using centralized sensors according to aspects of the present disclosure.

FIG. 4 is a diagram illustrating an example of a lighting control system 400 having a centralized architecture and using centralized sensors according to aspects of the present disclosure. As shown in FIG. 4, the lighting control system 400 is similar to the lighting control system 300 illustrated in FIG. 3, with the exception that the occupancy sensors are centralized to sense motion around multiple light fixtures. Referring to FIG. 4, the centralized occupancy sensor 436 may sense motion around the light fixtures 430a-430l in the open office space 470, the centralized occupancy sensor 456 may sense motion around the light fixtures 454a and 454b in the private office 450, and the centralized occupancy sensor 466 may sense motion around the light fixtures 464a and 464b in the private office 460. The centralized occupancy sensors 436, 456, and 466 may be mounted on a wall or ceiling and may be connected to the network 410.

Each centralized occupancy sensor 436, 456, and 466 may include a processor or controller, a communications unit, and a memory. The communications unit may enable the occupancy sensor to communicate via a wired or wireless network. The communication unit may represent one or more components that facilitate a network connection. As in the lighting control system 300 shown in FIG. 3, devices on multiple networks (e.g., the networks 410 and 410) may be associated via the central controller 440. The central controller 440 may function in the same manner as the central controller 240.

The lighting control system 400 using centralized sensors may be commissioned in a similar manner as the lighting control 300 system using distributed sensors. For example, a first lighting group may be formed for the private office 450 by first commanding the devices in the lighting control system 400 into a pairing mode. A technician may use the wall station 452 to transmit a signal to the central controller 440 indicating that the devices in the lighting control system should be commanded into pairing mode. The transmitted signal from the wall station 452 may include a network address or other identifier of the wall station 452. The central controller 440 may associate the network address or other identifier of the wall station 452 with a first lighting group and may issue commands to the devices via the first network 410 and the second network 420 to cause the devices to enter pairing mode.

Entering pairing mode may cause the sensitivity of the centralized occupancy sensors 436, 456, and 466 to be reduced such that motion outside the space monitored by the centralized occupancy sensors may not be detected. The central controller 240 may transmit a signal to the processor or controller in each light fixture to cause the processor or controller in the light fixture to change the light intensity to a different level (e.g., increase intensity, decrease intensity, blink, change color, or another visual indication) from its current level upon entering pairing mode. As the technician walks under each of the light fixtures 454a and 454b, the centralized occupancy sensor 456 may sense the motion. The centralized occupancy sensor 456 may sense the motion under the light fixture 454a and transmit a detection signal to the central controller 440 identifying the light fixture 454a as a light fixture to be associated with the first lighting group. Signal processing by the embedded controller, or the central controller in a system including a central controller, may correlate the location of the detected motion with the position of a lighting fixture or wall station. After receiving the signal from the centralized occupancy sensor 456, the central controller 440 may associate a network address or other identifier of the light fixture 454a with an identifier (e.g., an identification number) of the first lighting group. The central controller 440 may transmit another signal to cause the processor or controller in the light fixture 454a to change the light intensity to a different level (e.g., increase intensity, decrease intensity, blink, change color, or another visual indication) from its current level when the light fixture is associated with the lighting group.

The centralized occupancy sensor 456 may also sense the motion under the light fixture 454b and transmit a detection signal to the central controller 440 identifying the light fixture 454b as being associated with the first lighting group. After receiving the signal from the centralized occupancy sensor 456, the central controller 440 may associate a network address or other identifier of the light fixtures 454b with an identifier (e.g., an identification number) of the first lighting group. The central controller 440 may transmit another signal to cause the processor or controller in the light fixture 454b to change the light intensity to a different level (e.g., increase intensity, decrease intensity, blink, change color, or another visual indication) from its current level when the light fixture is associated with the lighting group.

Similarly, the technician may cause the central controller 440 to command the lighting control system 400 into pairing mode with wall station 462 to associate light fixtures 464a and 464b with a second lighting group by walking beneath the light fixtures and having the motion sensed by the centralized occupancy sensor 466. The technician may also cause the central controller 440 to command the lighting control system 400 into pairing mode with wall station 432 to associate light fixtures 430a-430l with a third lighting group by walking beneath the light fixtures and having the motion sensed by the centralized occupancy sensor 436.

According to aspects of the present disclosure, the central controller may maintain a record of the associations of light fixtures and wall stations with lighting groups. For example, the central controller may store in a data structure (e.g., a list or table) in memory the associations of lighting group identifiers with network addresses or other identifiers of the devices. Alternatively or additionally, the data structure may be stored in each of the devices.

Figure 5:
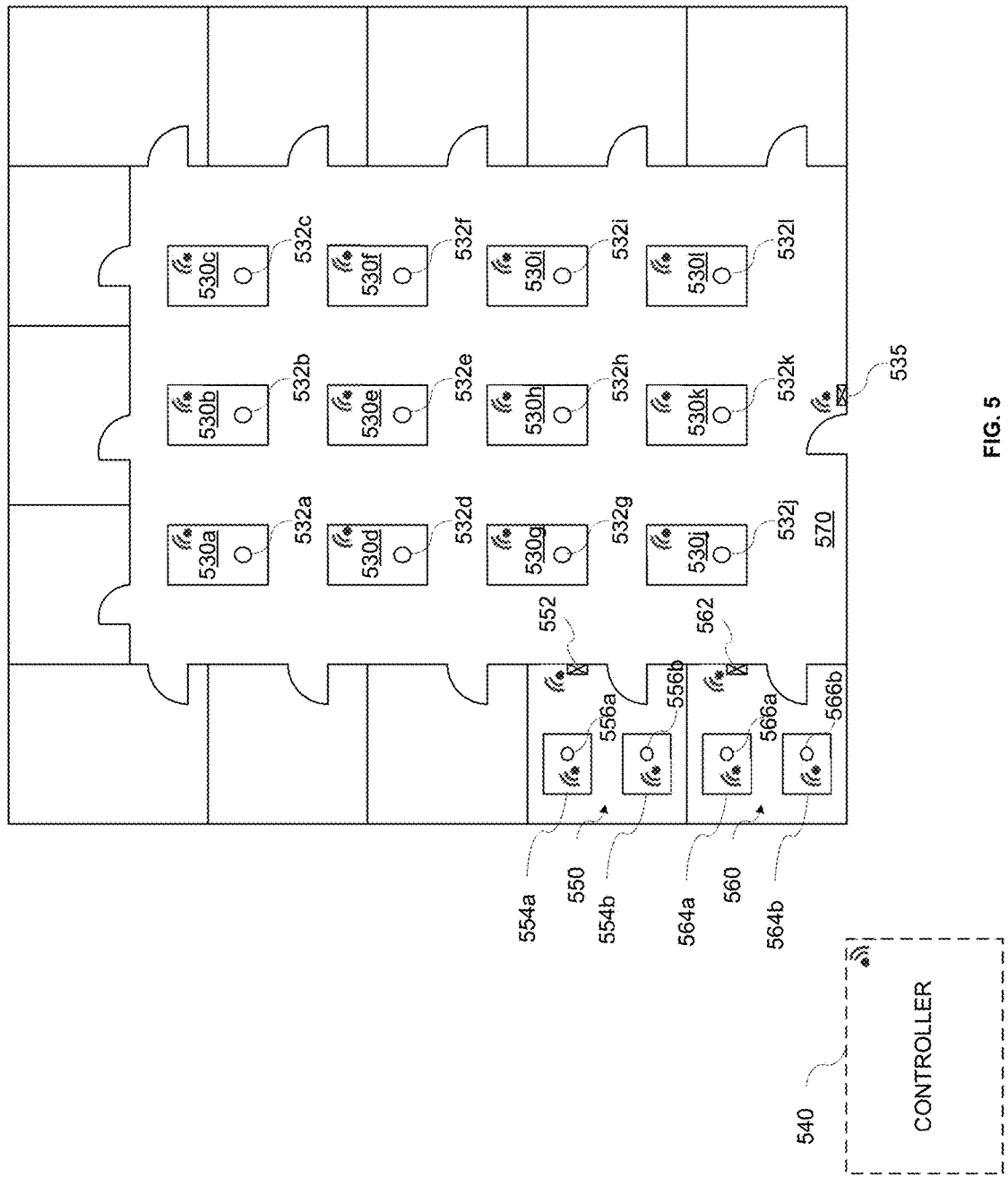
FIG. 5 is a diagram illustrating an example of a lighting control system having a distributed architecture and using distributed sensors according to aspects of the present disclosure.

In some embodiments, a lighting control system may be implemented with a wireless distributed architecture. In accordance with aspects of the present disclosure, wireless lighting control systems may be commissioned in a manner similar to the wired lighting control systems. FIG. 5 is a diagram illustrating an example of a lighting control system 500 having a wireless distributed architecture and using distributed sensors according to aspects of the present disclosure. In a distributed architecture, each device (e.g., wall station, light fixture, etc.) can include an embedded controller or processor. Each device may include a wireless communication unit (e.g., the communications unit 135 or the communications unit 160) and may communicate with other devices to form a wireless network. Each device may have a network address or other identifier to identify the device on the network. Referring to FIG. 5, sensors 532a-532l (e.g., occupancy sensors) may be distributed in the light fixtures 530a-530l, with each light fixture 530a-530l having its own embedded occupancy sensor 532a-532l to detect motion in the vicinity of the light fixture 530a-530l and provide a motion detection signal to the embedded controllers in the light fixtures. For example, when the embedded occupancy sensor 532a-532l detects motion of a person near the light fixture 530a-530l, the embedded occupancy sensor 532a-532l may generate a signal to the embedded controller or processor (e.g., the controller or processor 105) of the light fixture 530a-530l.

With wireless lighting control systems, the lighting groups can be formed by wireless communication between the devices on the wireless network. Each individual wireless device (e.g., light fixture, wall station, etc.) can be associated with a particular lighting group based on for example, an IP address, MAC address, or other network address or identifier, by responding to a broadcast message from one of the devices. To form a lighting group, a technician may operate a wall station to cause the wireless devices in the lighting installation to enter a pairing mode. The technician may input a command to the wall station by, for example, a specified sequence of button presses, a selection on a touch screen display, a software application executing on a mobile device, or another method of interfacing with the wall station. An embedded controller or processor in a wall station may cause a message to be wirelessly broadcast to the light fixtures and other wall stations on the wireless network of the wireless lighting control system. Devices on the wireless network may then be selected to be associated with a lighting group formed with the broadcasting wall station.

Referring again to the example of FIG. 5, during commissioning, a lighting group may be formed for the open office space 570 controlled by the wall station 535. The wall station 535 may act as a primary controller for the lighting group. The technician may input a command to the wall station 535 by, for example, a specified sequence of button presses, a selection on a touch screen display, a software application executing on a mobile device, or another method of interfacing with the wall station 535. The embedded controller or processor in the wall station 535 may cause the communications unit to wirelessly broadcast a message to the light fixtures and other wall stations on the wireless network. The message may include an identifier (e.g., an identification number) of the lighting group associated with the wall station 535. Each of the devices on the wireless network that has not already been paired may receive the broadcast message from the wall station 535 and may enter a pairing mode.

When in pairing mode, sensitivity of the embedded sensors (e.g., occupancy sensors) in the devices (e.g., light fixtures) may be reduced such that motion of a person may be detected only in the immediate vicinity, for example directly beneath, a light fixture. In addition, the light intensity emitted by the light fixtures may change to different levels (e.g., increase intensity, decrease intensity, blink, change color, or another visual indication) from their current levels to indicate that the light fixtures are in pairing mode. In some implementations, wall stations may also include embedded sensors such as occupancy sensors. In these implementations, the sensitivity of the sensors may be reduced such that the motion of a person directly in front of the wall station may be detected.

While in pairing mode, the technician may walk beneath each light fixture 530a-530l and/or near each additional wall station to be included in the lighting group. Since the sensitivity of the sensors embedded in the light fixtures is reduced in pairing mode, only the sensor (e.g., occupancy sensor 532a-532l) embedded in the light fixture (e.g., light fixture 530a-530l) under which the technician is walking may detect the motion of the technician. Alternatively, the sensor may use the proximity of the technician to the fixture (if capable of determining distance) and a specified range based on the size and type of the fixture to determine when the technician is under the light fixture. A signal indicating the detection may be transmitted from the embedded occupancy sensor 532a-532l to the embedded controller or processor of the light fixture 530a-530l. Based on the received signal, the embedded controller or processor of the light fixture 530a-530l may associate the light fixture 530a-530l with the wall station 535 as part of the lighting group. The embedded controller or processor of the light fixture 530a-530l may cause a signal to be transmitted to the wall station 535 indicating that the light fixture 530a-530l has been associated with the lighting group.

The embedded controller or processor of the light fixture 530a-530l may cause the association to be stored in a memory of the light fixture. For example, a lighting group identifier and an identifier (e.g., a network address or other identifier) of the wall station acting as the primary controller of the lighting group, as well as identifiers of other devices associated with the lighting group, may be stored in a data structure (e.g., a list or table) in memory of the light fixture. Additionally or alternatively, the data structure may be stored in the memory of the wall station. In some implementations, the data structure may be stored only in the memory of the wall station. When the light fixture 530a-530l is associated with the lighting group, the light intensity emitted by the light fixture 530a-530l may change to a different level (e.g., increase intensity, decrease intensity, blink, change color, or another visual indication) from its current levels to indicate the association. For example, the embedded controller or processor of the light fixture 530a-530l may cause the light fixture to increase the light intensity. While in pairing mode, the technician may walk beneath each light fixture in the open office space 570 to cause each of the light fixtures to be associated with the lighting group controlled by the wall station 535.

After all the devices to be associated with the lighting group have been selected, the technician may then return to the wall station 535 and enter a second specified sequence of button presses or a selection on a touch screen display or otherwise interact with the wall station 535 to cause the wall station 535 to transmit an exit signal to the devices on the wireless network. The embedded controller of the wall station 535 may transmit signals to the devices on the wireless network to cause the devices to exit the pairing mode. Upon exiting the pairing mode, the embedded controller or processor of each light fixture may cause the light fixtures to change their light intensity levels to different levels (e.g., increase intensity, decrease intensity, blink, change color, or another visual indication) from their current levels. Once a device has been paired, it will not enter pairing mode again during the commissioning process. Devices may be disassociated from their lighting groups, for example, by special commands issued from the embedded controller of the wall station controlling the lighting group, and again be available for pairing.

Lighting groups for private offices 550 and 560 may be similarly formed. The technician may put the lighting control system into pairing mode using wall station 552, and walk beneath light fixtures light fixtures 554a and 554b. When the occupancy sensors 556a and 556b sense the motion of the technician beneath the respective light fixtures 554a and 554b, the light fixtures 554a and 554b may be associated with the wall station 552 as described above. The technician may cause the lighting control system to exit the pairing mode using wall station 552. The technician may again put the lighting control system into pairing mode using wall station 566 and walk beneath light fixtures light fixtures 564a and 564b to pair the light fixtures with the wall station 562 and exiting the pairing mode using wall station 566. Similarly, a lighting group including wall station 562 and light fixtures 564a and 564b may be formed by sensing the motion of the technician beneath light fixtures 564a and 564b by occupancy sensors 566a and 566b. The embedded controller or processor of the light fixtures 554a, 554b, 564a, and 564b may cause a signal to be transmitted to the wall stations 552 and 562, respectively, indicating that the light fixtures have been associated with the respective lighting groups.

In some embodiments, the embedded controllers or processors in each of the wireless devices may optionally communicate with a wireless central controller 540. The wireless central controller 540 may communicate with the wireless devices to perform functions similar to the central controller (e.g., the central controller 240) in the wired lighting control system embodiments explained above.

In some embodiments, a lighting control system implemented with a centralized architecture may use a centralized occupancy sensor rather than distributed sensors embedded in the light fixtures. A centralized occupancy sensor, for example, an ultrasonic sensor, a high-frequency radio frequency (RF) sensor, etc., may be used to sense motion for multiple light fixtures, for example all the light fixtures in one room. The centralized occupancy sensor may be a "directionally aware" sensor capable of determining a direction from which motion is detected. A directionally aware centralized occupancy sensor may enable multiple lighting zones to be defined within a large space using the one occupancy sensor. The centralized occupancy sensor may sense motion in the room around each of the light fixtures and provide a motion detection signal to the central controller.

A directionally aware centralized occupancy sensors can differentiate between motion occurring in the room in which it is mounted and motion that is not occurring in the room. For example, high-frequency RF sensors (e.g., ultra-wide-band (UWB), time-of-flight (TOF), etc.) have some ability to penetrate walls, but provides low resolution images of objects within its field of view enabling the use of signal processing to detect the location of objects such as light fixtures as well as to detect where motion occurs. Ultrasonic sensors may also determine a location of motion within a room.

Figure 6:
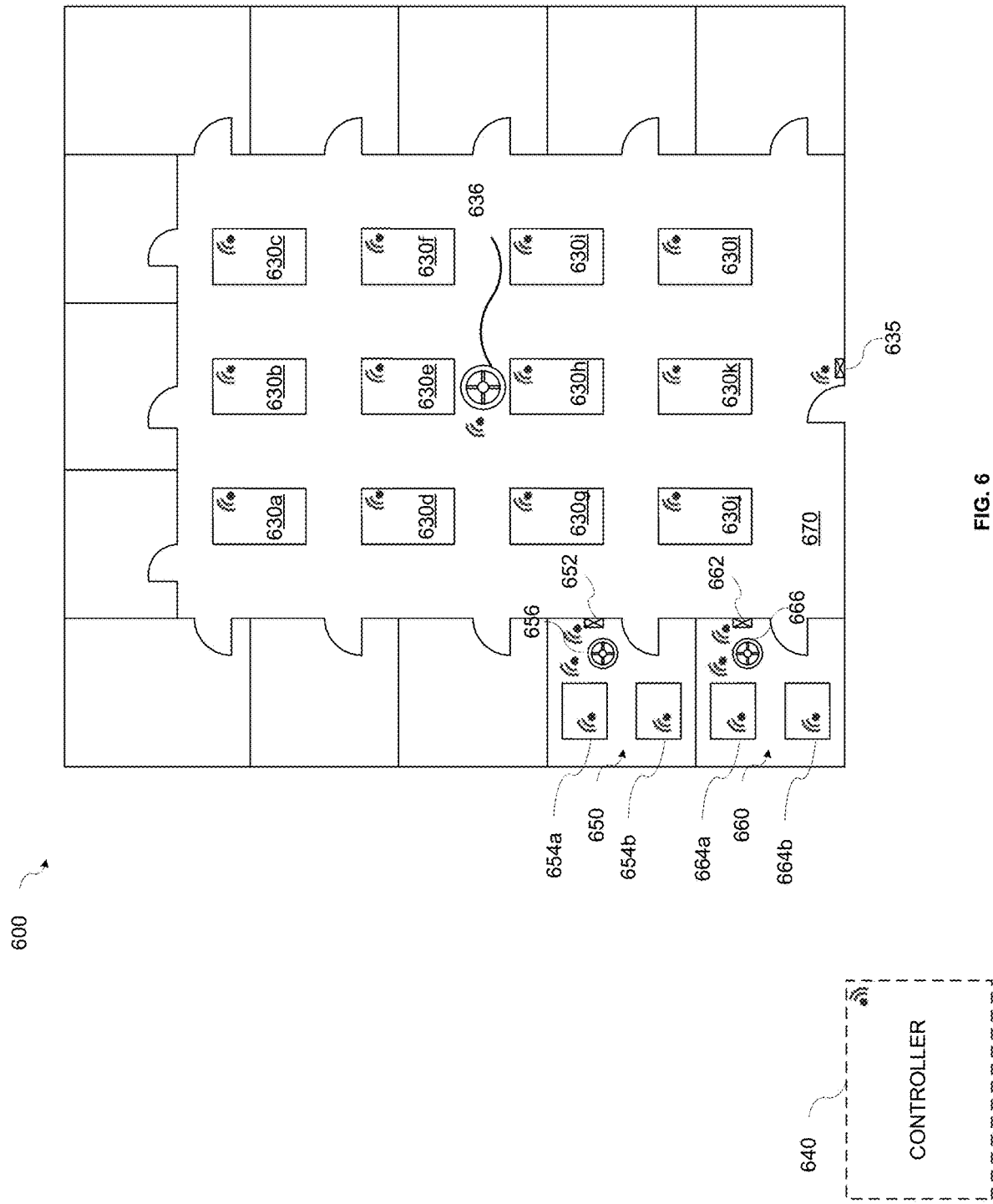
FIG. 6 is a diagram illustrating an example of a lighting control system having a distributed architecture and using centralized sensors according to aspects of the present disclosure.

FIG. 6 is a diagram illustrating an example of a lighting control system 600 having a distributed architecture and using centralized sensors according to aspects of the present disclosure. As shown in FIG. 6, the lighting control system 600 is similar to the lighting control system 500 illustrated in FIG. 5, with the exception that the occupancy sensors are centralized to sense motion around multiple light fixtures. Referring to FIG. 6, the centralized occupancy sensor 636 may sense motion around the light fixtures 630a-630l in the open office space 670, the centralized occupancy sensor 656 may sense motion around the light fixtures 654a and 654b in the private office 650, and the centralized occupancy sensor 666 may sense motion around the light fixtures 664a and 664b in the private office 660. The occupancy sensors 636, 656, and 666 may additionally include daylight sensors.

In a distributed architecture, each device (e.g., wall station, light fixture, sensor, etc.) can include an embedded controller or processor. Each device may include a wireless communication unit (e.g., the communications unit 135 or the communications unit 160) and may communicate with other devices to form a wireless network. Each device may have a network address or other identifier to identify the device on the network. Referring to FIG. 6, centralized occupancy sensors 636, 656, and 666 may be connected to a wireless network formed by the wireless wall stations, light fixtures, and sensors. Each centralized occupancy sensor 636, 656, and 666 may include a processor or controller, a communications unit, and a memory. The communications unit may enable the occupancy sensor to communicate via a wired or wireless network. The communication unit may represent one or more components that facilitate a wireless network connection. The centralized occupancy sensors 636, 656, and 666 may detect motion in the vicinity of the light fixtures and generate motion detection signal to the embedded controllers of the light fixtures. For example, when the embedded occupancy sensor 636 detects motion of a person near one of light fixtures 630a-630l, the occupancy sensor 636 can generate a signal to the embedded controller or processor (e.g., the controller or processor 105) of the light fixture 630a-630l corresponding to the detected motion.

The lighting control system 600 using centralized sensors may be commissioned in a similar manner as the lighting control 500 system using distributed sensors. For example, during commissioning, a lighting group may be formed for the open office space 670 controlled by the wall station 635. The wall station 635 may act as a primary controller for the lighting group. The technician may input a command to the wall station 635 by, for example, a specified sequence of button presses, a selection on a touch screen display, a software application executing on a mobile device, or another method of interfacing with the wall station 635. The embedded controller or processor in the wall station 635 may cause the communications unit to wirelessly broadcast a message to the light fixtures and other wall stations on the wireless network. The message may include an identifier (e.g., an identification number) of the lighting group associated with the wall station 635. Each of the devices on the wireless network that has not already been paired may receive the broadcast message from the wall station 635 and may enter a pairing mode.

When in pairing mode, sensitivity of the centralized sensors (e.g., occupancy sensors) may be reduced such that motion such that motion outside the space monitored by the centralized occupancy sensors may not be detected. In addition, the embedded controllers in the light fixtures may cause the light intensity emitted by the light fixtures to change to different levels (e.g., increase intensity, decrease intensity, blink, change color, or another visual indication) from their current levels to indicate that the light fixtures are in pairing mode. In some implementations, wall stations may also include embedded sensors such as occupancy sensors. In these implementations, the sensitivity of the sensors may be reduced such that the motion of a person directly in front of the wall station may be detected.

While in pairing mode, the technician may walk beneath each light fixture 630a-630l and/or additional wall station to be included in the lighting group. As the technician walks under each of the light fixtures 630a-630l, the centralized occupancy sensor 636 may sense the motion and transmit a detection signal to the appropriate light fixture. For example, as the technician walks beneath light fixture 630a, the centralized occupancy sensor 636 may sense the motion and transmit a detection signal to the embedded controller of the light fixture 630a identifying the light fixture 630a as a light fixture to be associated with the lighting group. Signal processing by the embedded controller, or the central controller in a system including a central controller, may correlate the location of the detected motion with the position of a lighting fixture or wall station. After receiving the signal from the centralized occupancy sensor 636, the embedded controller of the light fixture 630a may associate a network address or other identifier of the light fixture 630a with an identifier (e.g., an identification number) of the lighting group. The embedded controller may cause the light fixture 630a to change the light intensity to a different level (e.g., increase intensity, decrease intensity, blink, change color, or another visual indication) from its current level when the light fixture is associated with the lighting group.

The technician may then return to the wall station 635 and enter a second specified sequence of button presses or a selection on a touch screen display or otherwise interact with the wall station 635 to cause the wall station 635 to transmit an exit signal to the devices on the wireless network. The embedded controller of the wall station 635 may transmit signals to the devices on the wireless network to cause the devices to exit the pairing mode. Upon exiting the pairing mode, the embedded controller or processor of each light fixture may cause the light fixtures to change their light intensity levels to different levels (e.g., increase intensity, decrease intensity, blink, change color, or another visual indication) from their current levels. Once a device has been paired, it will not enter pairing mode again during the commissioning process. Devices may be disassociated from their lighting groups, for example, by special commands issued from the embedded controller of the wall station controlling the lighting group, and again be available for pairing.

Lighting groups for private offices 650 and 660 may be similarly formed. The technician may put the lighting control system into pairing mode using wall station 652, and walk beneath light fixtures light fixtures 654a and 654b. When the occupancy sensor 656 senses the motion of the technician beneath the respective light fixtures 654a and 654b, the light fixtures 654a and 654b may be associated with the wall station 652 as described above. The technician may cause the lighting control system to exit the pairing mode using wall station 652. The technician may again put the lighting control system into pairing mode using wall station 662 and walk beneath light fixtures light fixtures 664a and 664b to pair the light fixtures with the wall station 662 and exiting the pairing mode using wall station 662. Similarly, a lighting group including wall station 662 and light fixtures 664a and 664b may be formed by sensing the motion of the technician beneath light fixtures 664a and 664b by occupancy sensor 666.

In some embodiments, the embedded controllers or processors in each of the wireless devices may optionally communicate with a wireless central controller 640. The wireless central controller 640 may communicate with the wireless devices to perform functions similar to the central controller (e.g., the central controller 440) in the wired lighting control system embodiments explained above.

Figure 7:
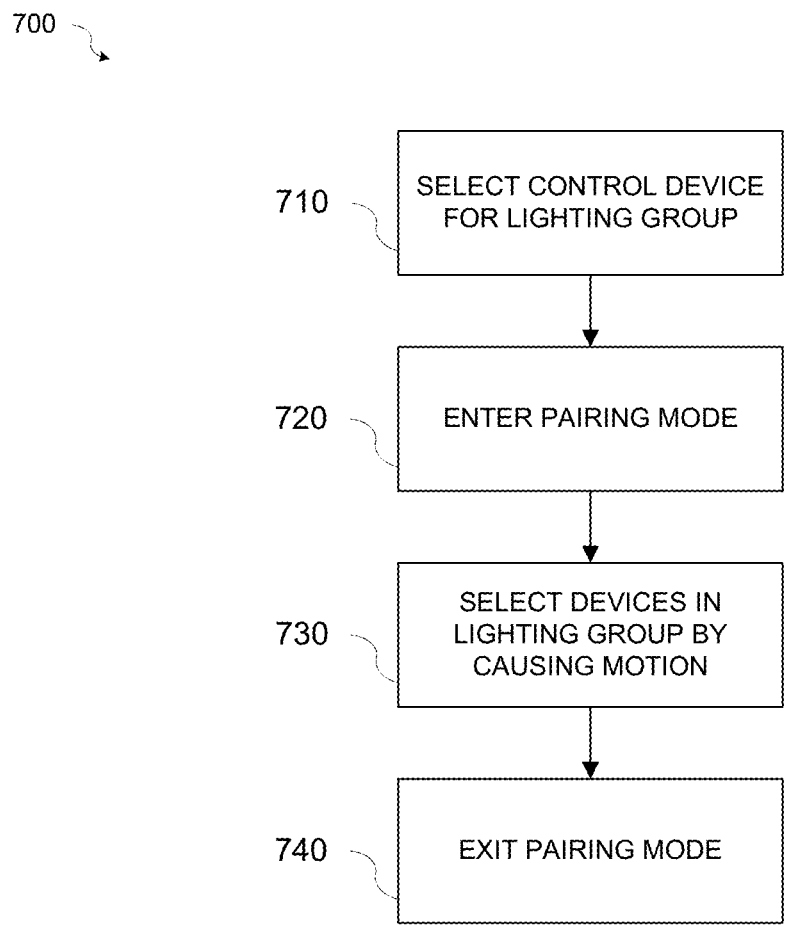
FIG. 7 is a flowchart illustrating an example of a method for commissioning a lighting control system according to aspects of the present disclosure.

FIG. 7 is a flowchart illustrating an example of a method 700 for commissioning a lighting control system according to aspects of the present disclosure. The lighting control system may form a wired or wireless network of devices (e.g., light fixtures, wall stations, sensors, etc.). At block 710, a control device for the lighting group may be selected. For example, a wall station may be selected to provide control functions, for example, but not limited to, on-off switching, dimming, etc., for light fixtures in a lighting group of the lighting control system for a selected space. The wall station may include an embedded controller or processor and/or may communicate wirelessly or over a wired connection via a communication unit with a central lighting controller and/or light fixtures and/or sensors in a lighting group. The wall station may include a user interface, for example, one or more buttons and/or a touch screen, to enable a user to input commands for controlling a lighting group. In some implementations, a software application, for example an application executing on a mobile device, may be operable to communicate with the wall station to input commands to the wall station. In some implementations, the wall station may include one or more sensors, for example, but not limited to, occupancy sensors, light sensors, etc. Each lighting group formed in the lighting control system may include one or more wall stations.

At block 720, pairing mode may be entered. The selected control device may be used to command the devices in the lighting control system into a pairing mode. A technician may use the wall station to command the networked devices into pairing mode by, for example, a specified sequence of button presses, a selection on a touch screen display, a software application executing on a mobile device, or another method of interfacing with the wall station. The command entered via the wall station may be transmitted to the central controller, and the central controller may transmit signals to the devices to command them into the pairing mode. Alternatively, in a lighting control system without a central controller (e.g., in a wireless lighting control system), an embedded controller or processor in the wall station may cause a message to be wirelessly broadcast to the light fixtures and other wall stations on the wireless network of the wireless lighting control system to enter the pairing mode.

When in pairing mode, sensitivity of the embedded sensors (e.g., occupancy sensors) in the devices (e.g., light fixtures) may be reduced such that motion of a person may be detected only in the immediate vicinity, for example directly beneath, a light fixture. In addition, the light intensity emitted by the light fixtures may change to different levels (e.g., increase intensity, decrease intensity, blink, change color, or another visual indication) from their current levels to indicate that the light fixtures are in pairing mode. In some implementations, wall stations may also include embedded sensors such as occupancy sensors. In these implementations, the sensitivity of the sensors may be reduced such that the motion of a person directly in front of the wall station may be detected. Devices on the wireless network may then be selected to be associated with a lighting group formed with the broadcasting wall station.

At block 730, devices to be included in the lighting group may be selected by causing motion in the vicinity of the selected devices. While in pairing mode, the technician may walk beneath each light fixture and/or near each additional wall station to be included in the lighting group. Since the sensitivity of the sensors is reduced in pairing mode, the sensors may detect the motion of the technician in the vicinity of a light fixture or wall station. For example, an occupancy sensor embedded in a light fixture may sense the motion of a technician walking beneath the light fixture. Alternatively, the sensor may use the proximity of the technician to the fixture (if capable of determining distance) and a specified range based on the size and type of the fixture to determine when the technician is under the light fixture. A signal indicating the detection may be transmitted from the embedded occupancy sensor to the embedded controller or processor of the light fixture, or to a central controller in a system that includes a central controller. Based on the received signal, the embedded controller or processor of the light fixture (or central controller) may associate the light fixture with the wall station as part of the lighting group.

Alternatively, a directionally aware centralized occupancy sensor may sense motion as the technician walks beneath the light fixtures and transmit a detection signal to the embedded controller of the light fixture, or the central controller in a system including a central controller, identifying the light fixture as a light fixture to be associated with the lighting group. Signal processing by the embedded controller (or the central controller) may correlate the location of the detected motion with the position of a lighting fixture or wall station. After receiving the signal from the centralized occupancy sensor, the embedded controller of the light fixture (or the central controller) may associate a network address or other identifier of the light fixture with an identifier (e.g., an identification number) of the lighting group. The embedded controller (or the central controller) may cause the light fixture to change the light intensity to a different level (e.g., increase intensity, decrease intensity, blink, change color, or another visual indication) from its current level when the light fixture is associated with the lighting group.

The embedded controller or processor of the light fixture may cause the association to be stored in a memory of the light fixture. For example, a lighting group identifier and an identifier (e.g., a network address or other identifier) of the wall station acting as the primary controller of the lighting group may be stored in the memory. In lighting control systems including a central controller, the lighting group identifiers and associated device identifiers may be alternatively or additionally stored in the central controller and/or in each device.

At block 740, the pairing mode may be exited. After all the devices to be associated with the lighting group have been selected, the technician may then return to the wall station selected as the control device for the lighting group and enter a second specified sequence of button presses or a selection on a touch screen display or otherwise interact with the wall station to cause the wall station to transmit an exit signal to the devices on the network. The embedded controller of the wall station may transmit signals to the devices on the network, or to a central controller, to cause the devices to exit the pairing mode. Upon exiting the pairing mode, the embedded controller or processor of each light fixture may cause the light fixtures to change their light intensity levels to different levels (e.g., increase intensity, decrease intensity, blink, change color, or another visual indication) from their current levels. Once a device has been paired, it will not enter pairing mode again during the commissioning process. Devices may be disassociated from their lighting groups, for example, by special commands issued from the embedded controller of the wall station controlling the lighting group, and again be available for pairing.

The method 700 may be embodied on a non-transitory computer readable medium, for example, but not limited to, the memory (e.g., the memory 130, 170, or memory of the central controller (not shown)) or other non-transitory computer readable medium known to those of skill in the art, having stored therein a program including computer executable instructions for making a processor, computer, or other programmable device execute the operations of the method.

It should be appreciated that the specific steps illustrated in FIG. 7 provide a particular method for commissioning a lighting control system according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Although the above examples may be described as using one or more sensors integrated with the light fixtures or located remotely from the light fixtures, embodiments in accordance with the present disclosure are not limited to this implementation. According to various aspects of the present disclosure, the one or more sensors may be a combination of sensors integrated with the light fixtures and located remotely from the light fixtures.

It should be appreciated that other implementations of other types of light fixtures deployed in conjunction with embodiments of the present disclosure are possible without departing from the scope of protection.

Other embodiments according to the present disclosure may provide methods for waking-up battery-powered wireless sensors for a lighting control system from a reduced power mode. The battery-powered wireless sensors may be, for example, the wireless sensors (wireless sensors 636, 656, 666) described with respect to FIG. 6. In some cases, updating of settings for battery-powered wireless sensors installed and provisioned in lighting control systems may be performed. In other cases, provisioning of new battery-powered wireless sensors added to a lighting control system may be performed.

Figure 8:
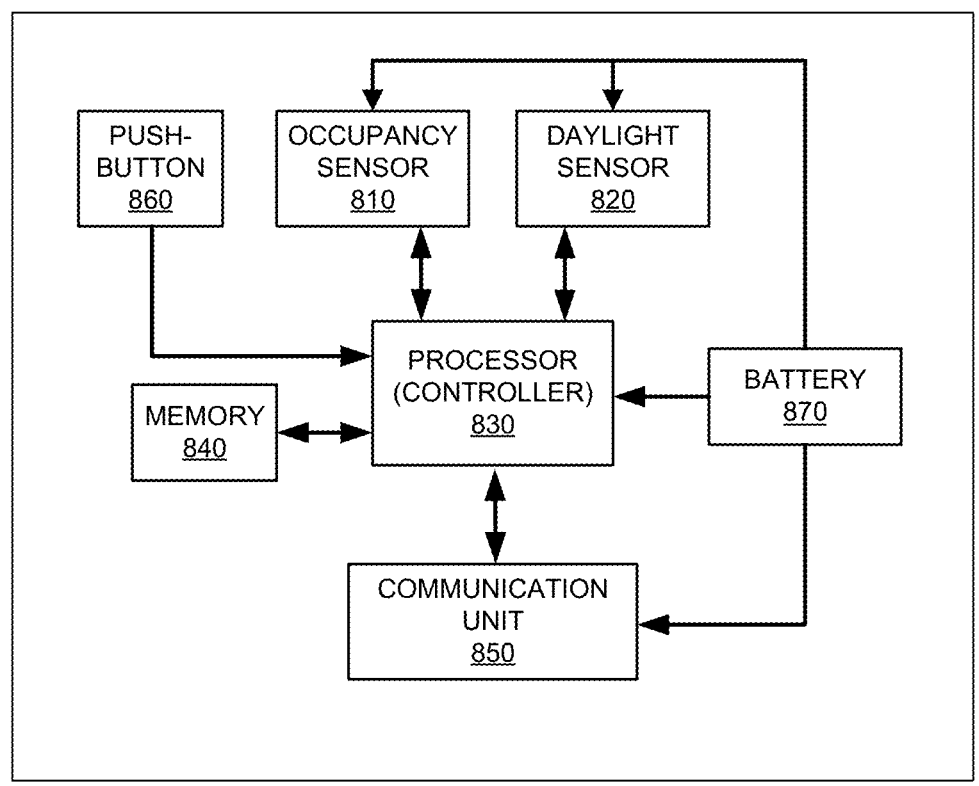
FIG. 8 is a block diagram of an example of a battery-powered wireless sensor for a lighting control system according to aspects of the present disclosure.

FIG. 8 is a block diagram of an example of a battery-powered wireless sensor 800 for a lighting control system according to aspects of the present disclosure. Referring to FIG. 8, the battery-powered wireless sensor 800 may include an occupancy sensor 810, a daylight sensor 820, a processor 830, a memory 840, a communication unit 850, a battery 870, and a push-button switch 860. The processor 830 may control overall operation of the wireless sensor 800. The processor 830 may be a microprocessor, microcomputer, computer, microcontroller, programmable controller, an embedded controller, or other programmable device. The processor 830 may be part of a distributed lighting control network in which the processors in each device communicate with each other without involvement of a central lighting controller. Alternatively, the processor 830 may communicate with a central lighting controller as part of a centrally controlled lighting control system.

The processor 830 may communicate with a memory 840. The memory 840 may be processor-readable solid state storage media, for example, but not limited to, RAM, ROM, EEPROM, FLASH memory, or other solid state storage devices that may be used to store desired program code in the form of instructions or data structures and that may be accessed by and/or operated upon by the processor 830.

The battery 870 may be included within a housing of the wireless sensor 800 and may provide power for the occupancy sensor 810, the daylight sensor 820, the processor 830, the memory 840, and the communications unit 850.

The occupancy sensor 810 may sense the motion of an occupant in the vicinity of the wireless sensor 800 in a room monitored by the wireless sensor 800. The occupancy sensor 810 may be, for example, but not limited to, a passive infrared (PIR) sensor, a radar sensor, a "time of flight" (TOF) sensor, (e.g., laser, radio, acoustic, etc.), or an ultra-wideband (UWB) sensor. PIR sensors detect infrared radiation (i.e., radiant heat) emitted by or reflected from objects in their field of view. Doppler radar based occupancy sensors transmit a known continuous wave frequency and continuously detect reflections from objects within their field. TOF sensors measure the distance between the sensor and an object based on the time difference between the emission of the signal (e.g., an optical or acoustic signal) and its return to the sensor after being reflected by the object. UWB sensors use impulse radar techniques for emitting and sampling signal pulses to achieve accurate distance measurements determined by the time differences between transmitted and received pulses.

The daylight sensor 820 may be a photoresistor, a photodiode, a phototransistor, or other light sensitive device. The daylight sensor 820 may detect the intensity level of ambient light in a space. Other changes in ambient lighting conditions, for example, changes in color temperature or other light characteristics, may be detected by the daylight sensor 820. In some implementations, the battery-powered wireless sensor 800 may only include a daylight sensor 820.

The battery-powered wireless sensor 800 may include other types of sensors, for example, gas sensors, infrared (IR) sensors, ultrasonic sensors, audio sensor arrays, distance-based photoelectric sensors, radio frequency identification (RFID) tag readers, near field communication (NFC) tag readers, or other ranging technology sensors capable of detecting the presence of an occupant (not shown).

The communication unit 850 may enable the battery-powered wireless sensor 800 to communicate via one or more wireless networks. The communication unit 850 may represent one or more components that facilitate a network connection. In some implementations, the communication unit 850 may be a wireless communication device and can include a Bluetooth radio and a sub-gigahertz radio. For example, the communication unit 850 may include interfaces for sub-gigahertz communications as well as wireless interfaces such as IEEE 802.11, 802.15.4, Bluetooth, Bluetooth Low Energy (BLE), or radio interfaces for accessing cellular telephone networks (e.g., transceiver/antenna for accessing a CDMA, GSM, UMTS, or other mobile communications network).

The push-button switch 860 may provide an input to the processor 830. For example, a push of the push-button switch 860 by a user may cause the processor 830 to exit a low power mode and activate the communication unit 850.

The wireless sensor 800 may detect the presence of occupants in a space, the ambient light in the space, or both. Since the wireless sensor 800 may be battery-powered, the wireless sensor 800 may operate in a reduced power mode to conserve battery power. In the reduced power mode of the wireless sensor 800, the processor 830 may operate in a low power mode and the communication unit 850 may be powered off or may be in a low power mode. In the reduced power mode of the wireless sensor 800, the occupancy sensor 810 and the daylight sensor 820 may be operational to detect occupants or changes in ambient light, respectively. The wireless sensor 800 may enter the reduced power mode after a specified period of time during which no sensor stimulus is detected. For example, the wireless sensor 800 may enter the reduced power mode when the occupancy sensor does not detect occupants in the space monitored by the occupancy sensor for a specified period of time (e.g., five minutes or another period of time).

During reduced power operation, the wireless sensor 800 may "wake-up" (e.g., power up from the reduced power mode) at specified time intervals to transmit a status message. For example, if a space is unoccupied, the wireless sensor 800 may wake-up every 30 minutes or another period of time to transmit the status message. If the space is occupied, the wireless sensor 800 may wake-up every two minutes or another period of time to transmit the status message. Upon completing the status message transmission, the wireless sensor 800 may resume operation in the reduced power mode. The time period for operating in the reduced power mode may depend on stimuli received by the sensor. For example, the wireless sensor 800 may return to the reduced power operating mode for 30 minutes when the occupancy sensor does not detect occupants after status message transmission, or may return to the low power operating mode for only two minutes after status message transmission when occupants are detected. Implementations employing sensors other than occupancy sensors may use different reduced power and wake-up time periods. In some implementations where the battery-powered wireless sensor includes a daylight sensor (e.g., photosensor) but not an occupancy sensor, the battery-powered wireless sensor may wake-up at specified time intervals. For example, when an occupancy sensor is not present, the battery-powered wireless sensor may wake-up every two minutes or another time interval.

The battery-powered wireless sensor 800 may communicate with a continually powered device to transmit and receive messages via sub-gigahertz communications. The continually powered device may be another sensor, a light fixture, a network controller, or other network device. In some cases, for example, during provisioning, a battery-powered wireless sensor 800 may communicate with a user device (e.g., a mobile phone, laptop computer, or other mobile device) via Bluetooth or BLE. In some implementations, the battery-powered wireless sensor 800 may communicate with the continually powered device and with the user device via the same wireless communication protocol.

While operating in the reduced power mode of the wireless sensor 800, signals from the occupancy sensor 810 or the daylight sensor 820 that are received by the processor

830 may cause the processor 830 to resume full power operation. The processor 830 may cause the communication unit 850 to power up and transmit a status message to the continually powered device reporting the changes in occupancy or ambient light. The status message may be transmitted to the continually powered device via the sub-gigahertz radio of the communication unit 850. In some implementations, the status message may be an encrypted message. In some implementations, the status message may be an unencrypted message.

In some cases, updates to the configuration settings for the battery-powered wireless sensor 800 may be performed. Configuration settings, for example, changes to the sensitivity of the occupancy sensor 810 or the daylight sensor 820, changes to intervals for reporting status messages (wake-up intervals), or modifications related to other network features or parameters may be made. Updates for the battery-powered wireless sensor 800 may be communicated by the continually powered device to the sensor via sub-gigahertz communication. Since the battery-powered wireless sensor 800 may operate in the reduced power mode (e.g., with the communication unit 850 powered down) to conserve battery power, the wireless sensor 800 may need to wake up to receive the communications.

In order to communicate updates or other messages to the wireless sensor 800, a trigger may be provided to the continually powered device to activate the wireless sensor 800. The trigger may be, for example, a Bluetooth communication from a user device, a button push on an accessible sensor, a button push or sequence of button pushes on a user interface of a wall station, etc. When the continually powered device is a sensor having a daylight sensor, the trigger may be detection of a flashlight beam by the daylight sensor of the continually powered device. The trigger may cause the continually powered device to transmit an activation instruction to the wireless sensor 800 to delay returning to the reduced power mode. The activation instruction to the wireless sensor 800 may be transmitted a specified number of times over a specified time interval. However, since the wireless sensor 800 may be operating in the reduced power mode with the communication unit 850 powered down, the wireless sensor 800 may not initially receive the instruction from the continually powered device.

Similar to the method described above with regard to commissioning light fixtures, a technician may walk beneath each wireless sensor to be communicated with to provide a stimulus to the occupancy sensor. Since the occupancy sensor 810 is operational in the reduced power mode of the wireless sensor 800, the presence of the technician in the detection area of the occupancy sensor may be sensed by the occupancy sensor 810 causing the processor 830 to power up the communication unit 850 and transmit a status message to the continually powered device via sub-hertz communication. In implementations that include only a daylight sensor, the technician may use a light-emitting device, such as a flashlight, aimed at the daylight sensor 820 to provide a stimulus for the daylight sensor to sense the change in light and cause the wireless sensor 800 to power up. In some implementations, the sensor stimulus may be provided by changes in ambient light conditions including changes in color temperature or other light characteristics. In some implementations, other types of sensors, for example, but not limited to, proximity sensors, gas sensors, etc., may be used. Stimulus to any of the sensors included in the wireless sensor 800 may cause the wireless sensor 800 to power up.

In response to the status message from the battery-powered wireless sensor 800, the continually powered device may transmit the activation instruction to the battery-powered wireless sensor 800 to remain in an active mode with the processor 830 and the communication unit 850 fully operational for a specified period of time, for example, two hours or another period of time. In some implementations, the activation instruction may be an encrypted message. In some implementations, the activation instruction may be an unencrypted message. The response from the continually powered device may be a flag set in an acknowledgement message for the status message. Alternatively, the response from the continually powered device may be an additional message with the activation instruction. Transmission of the activation instruction from the continually powered device may be triggered before or after the wireless sensor 800 wakes up.

Figure 9:
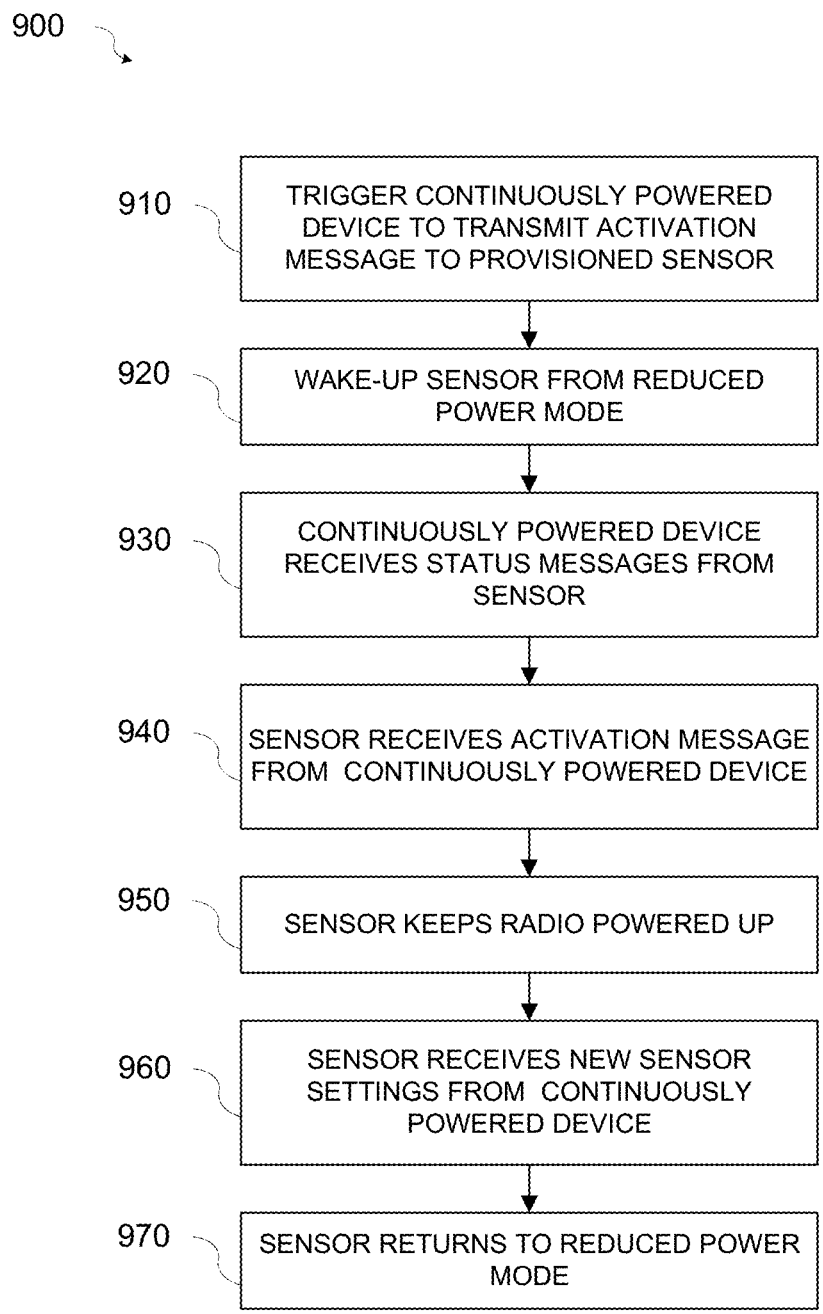
FIG. 9 is a flowchart illustrating an example of a method for waking up a provisioned battery-powered sensor for a lighting control system according to aspects of the present disclosure.

FIG. 9 is a flowchart illustrating an example of a method 900 for waking up a provisioned battery-powered wireless sensor for a lighting control system according to aspects of the present disclosure. Referring to FIG. 9, at block 910, a continuously powered device may be triggered to transmit an activation message to the provisioned battery-powered wireless sensor. In order to communicate configuration setting updates (e.g., occupancy or daylight sensor sensitivity, reporting (wake-up) intervals, changes to network features or parameters, etc.) or other messages to the wireless sensor 800, a trigger, for example, a Bluetooth communication from a user device, a button push on an accessible sensor, instructions entered on a user interface of a wall station (e.g., a button push or sequence of button pushes), etc., may be provided to the continuously powered device. In some cases, the trigger may be detection of a flashlight beam by the daylight sensor of the continually powered device. The trigger may cause the continually powered device to transmit an activation instruction to the wireless sensor 800. The activation instruction to the wireless sensor 800 may be transmitted a specified number of times over a specified time interval.

At block 920, the battery-powered wireless sensor may wake-up from reduced power mode. The wireless sensor 800 may be operating in the reduced power mode and may not initially receive the instruction from the continually powered device. The presence of a technician walking beneath the sensor may be sensed by the occupancy sensor 810, or the daylight sensor when a flashlight is used, causing the processor 830 to power up the communication unit 850 and transmit a status message to the continually powered device via the sub-gigahertz radio.

At block 930, the continuously powered device may receive status messages from the battery-powered wireless sensor. Upon wake-up, the battery-powered wireless sensor may transmit a status message to the continually powered device via the sub-gigahertz radio. In response to the status message from the battery-powered wireless sensor 800, the continually powered device may transmit the activation instruction to the battery-powered wireless sensor 800 to remain in an active mode. The activation instruction may be included in the response from the continually powered device as a flag set in an acknowledgement message for the status message. Alternatively, the activation instruction from the continually powered device may be included in an additional message with the activation instruction. Transmission of the activation instruction from the continually powered device may be triggered before or after the wireless sensor 800 wakes up. In some implementations, the activation instruction may be an encrypted message. In some implementations, the activation instruction may be an unencrypted message.

At block 940, the battery-powered wireless sensor may receive the activation instruction from the continuously powered device. The activation instruction may instruct the battery-powered wireless sensor to remain in an active mode with the processor 830 and the sub-gigahertz radio of the communication unit 850 operational for a specified period of time, for example, two hours or another period of time.

At block 950, the battery-powered wireless sensor may keep the sub-gigahertz radio powered up. The battery-powered wireless sensor 800 may remain in an active mode with the processor 830 and the sub-gigahertz radio of the communication unit 850 fully operational for the period of time in accordance with the activation instruction and may monitor the network communication channels for further messages from the continuously powered device.

At block 960, the battery-powered wireless sensor may receive new sensor settings from the continuously powered device. Updates for the battery-powered wireless sensor 800 or other messages may be communicated by the continually powered device to the sensor via the sub-gigahertz radio. The updates and other messages may be received by the battery-powered wireless sensor since the sub-gigahertz radio remains powered up according to the activation message received from the continuously powered device.

At block 970, the battery-powered wireless sensor may return to the reduced power mode. After the specified period of time during which the battery-powered wireless sensor remains fully operational, the sensor may return to operation in the reduced power mode. In the reduced power mode, the communication unit 850 may be powered down and the processor 830 may transition to a low-power mode. The occupancy sensor 810 and/or the daylight sensor 820 may remain operable to detect occupancy and ambient light, respectively. The time period for operating in the reduced power mode may depend on stimuli received by the sensor. For example, the wireless sensor 800 may return to the reduced power operating mode for 30 minutes when the occupancy sensor does not detect occupants after status message transmission, or may return to the low power operating mode for only two minutes after status message transmission when occupants are detected. Implementations employing sensors other than occupancy sensors may use different reduced power and wake-up time periods.

The method 900 may be embodied on a non-transitory computer readable medium known to those of skill in the art, having stored therein a program including computer executable instructions for making a processor, computer, or other programmable device execute the operations of the method.

It should be appreciated that the specific steps illustrated in FIG. 9 provide a particular method for waking up a provisioned battery-powered wireless sensor for a lighting control system according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. Many variations, modifications, and alternatives may be recognize without departing from the scope of the present disclosure.

In some cases new battery-powered wireless sensors may be added to a lighting control system. When a new battery-powered wireless sensor is added to the network, the new battery-powered wireless sensor may not be provisioned (e.g., not joined to the network of the lighting control system). The unprovisioned battery-powered wireless sensor may be configured to communicate over a predetermined number of specified sub-gigahertz communication channels, but may be unable to communicate on the sub-gigahertz channels used by the network of the lighting control system. More than one communication channel may be configured for the new battery-powered wireless sensor to reduce the possibility of external interference preventing communication with the unprovisioned sensor. An instruction communicated to a continually powered device of the lighting control network, for example, from a user device, may cause the continually powered device to communicate with the unprovisioned battery-powered wireless sensor via the specified sub-gigahertz communication channels. The continually powered device may communicate information (e.g., network communication channels, encryption keys, etc.) to provision the new battery-powered wireless sensor.

The unprovisioned battery-powered wireless sensor may operate in a reduced power mode. In the reduced power mode, the processor of the unprovisioned battery-powered wireless sensor may operate in a low-power mode and the communication unit may be powered off or may be in a low power mode. The occupancy sensor and/or the daylight sensor may be operational to detect occupants or changes in ambient light, respectively.

In order to add new battery-powered wireless sensors for an existing lighting control system network, or provision the battery-powered wireless sensors for a new lighting control system network, a continuously powered device may be commanded into an identification mode of operation. The continuously powered device may be commanded into the identification mode by, for example, a command received via Bluetooth from a user device, a sequence of button pushes on a user interface, etc.

In the identification mode, the continuously powered device may identify the unprovisioned battery-powered wireless sensors. The continuously powered device may broadcast an activation message to the unprovisioned battery-powered wireless sensors. In some implementations, the activation message may be encrypted message. In some implementations the activation message may be an unencrypted message. The activation message may be broadcast to the unprovisioned battery-powered sensors over the predetermined number of specified sub-gigahertz communication channels. The activation message may instruct the unprovisioned battery-powered sensors to activate their Bluetooth radio for a specified period of time, for example, one minute or another period of time.

The unprovisioned battery-powered wireless sensors may be operating in the reduced power mode with the communication units powered down and therefore may not initially receive the activation instruction from the continually powered device. Since the occupancy sensors of the unprovisioned battery-powered wireless sensor are operational in the reduced power mode the presence of the technician walking beneath the unprovisioned wireless sensors may be sensed by the occupancy sensor causing the processor to power up the sub-gigahertz radio of the communication unit. In implementations that include only a daylight sensor, the technician may use a flashlight aimed at the daylight sensor to sense the change in light and cause the unprovisioned wireless sensor to power up. After the unprovisioned battery-powered wireless sensors wake up, they may receive the activation instruction transmitted by the continually powered device over the predetermined number of specified sub-gigahertz communication channels. Transmission of the activation instruction from the continually powered device may be triggered before or after the unprovisioned wireless sensor wakes up.

Upon receiving the activation instruction, the unprovisioned wireless sensors may turn on their Bluetooth radios and monitor for transmissions from a user device for a specified period, for example 1 minute or another time period. The user device may transmit network credentials (e.g., sub-gigahertz communication channels used by the network, and encryption used by the network, etc.) via the Bluetooth radio to provision the unprovisioned battery-powered wireless sensors. After receipt of the Bluetooth transmission, the newly provisioned battery-powered wireless sensors may turn off the Bluetooth radio and connect to the lighting control network using the sub-gigahertz radio of the communication unit. Configuration settings, for example, occupancy or daylight sensor sensitivity, reporting (wake-up) intervals, changes to network features or parameters, etc., may then be transmitted to the newly provisioned battery-powered wireless sensors via the sub-gigahertz communication channels used by the network of the lighting control system.

Figure 10:
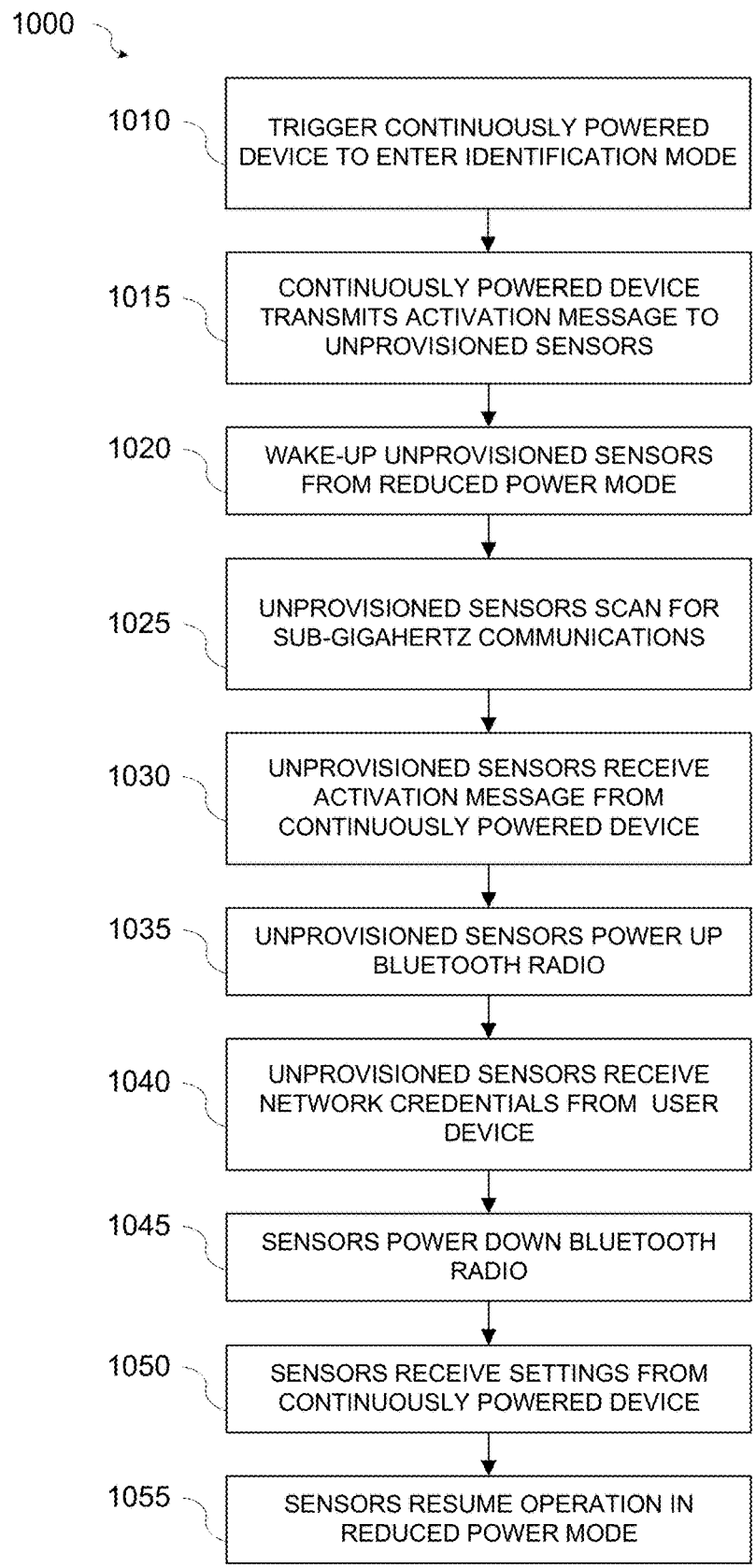
FIG. 10 is a flowchart illustrating an example of a method for waking up an unprovisioned battery-powered sensor for a lighting control system according to aspects of the present disclosure.

FIG. 10 is a flowchart illustrating an example of a method 1000 for waking up an unprovisioned battery-powered wireless sensor for a lighting control system according to aspects of the present disclosure. Referring to FIG. 10, at block 1010, a continuously powered device may be triggered to enter an identification mode. In order to add new battery-powered wireless sensors for an existing lighting control system network, or provision the battery-powered wireless sensors for a new lighting control system network, a continuously powered device may be commanded into an identification mode of operation. The continuously powered device may be commanded into the identification mode by, for example, a command received via Bluetooth from a user device, a sequence of button pushes on a user interface, etc. In the identification mode, the continuously powered device may identify the unprovisioned battery-powered wireless sensors.

At block 1015, the continually powered device may transmit an activation message to the unprovisioned battery-powered wireless sensors. The unprovisioned battery-powered wireless sensor may be configured with a predetermined number of specified sub-gigahertz communication channels available for wireless communication, but may be unable to communicate on the channels used by the network of the lighting control system. In some implementations, the activation message may be encrypted message. In some implementations the activation message may be an unencrypted message. The activation message may be sent to the unprovisioned battery-powered sensors over the predetermined number of specified sub-gigahertz communication channels.

At block 1020, the unprovisioned battery-powered wireless sensors may wake-up from reduced power mode. The unprovisioned battery-powered wireless sensors may be operating in the reduced power mode with the communication units powered down and therefore may not initially receive the activation instruction from the continually powered device. In order to wake-up the sensors, a technician may walk into areas monitored by the unprovisioned battery-powered wireless sensors. Since the occupancy sensors of the unprovisioned battery-powered wireless sensor are operational in the reduced power mode the presence of the technician walking beneath the unprovisioned wireless sensors may be sensed by the occupancy sensor causing the processor to power up the sub-gigahertz radio of the communication unit. In implementations that include only a daylight sensor, the technician may use a flashlight aimed at the daylight sensor to sense the change in light and cause the unprovisioned wireless sensor to power up.

At block 1025, the unprovisioned battery-powered wireless sensors may monitor for sub-gigahertz communications. After wake-up, the unprovisioned battery-powered wireless sensors may activate their sub-gigahertz radios and monitor the predetermined number of specified sub-gigahertz communication channels in order to receive messages from the continuously powered device. The sub-gigahertz radios may remain operational for a specified period of time, for example, two hours or another period of time.

At block 1030, the unprovisioned battery-powered wireless sensors may receive the activation message from the continually powered device. Transmission of the activation instruction from the continually powered device may be triggered before or after the unprovisioned wireless sensors wake up. The activation message may instruct the unprovisioned battery-powered sensors to activate their Bluetooth radio for a specified period of time, for example, one minute or another period of time.

At block 1035, the unprovisioned battery-powered wireless sensors may power up the Bluetooth radios. Upon receiving the activation instruction, the unprovisioned wireless sensors may turn on their Bluetooth (e.g., BLE) radios and monitor for transmissions from a user device for a specified period, for example one minute or another time period. BLE enables higher transmission speed between the user device and the unprovisioned battery-powered wireless sensors for communicating the network credentials used by the unprovisioned battery-powered wireless sensors to join the network of the lighting control system. During normal operation of the lighting control system network, the battery-powered wireless sensors communicate only with the continuously powered device, and communication with the continuously powered device is performed using only the sub-gigahertz radios. Sub-gigahertz communication has increased range, although lower transmission speed, compared to Bluetooth communication.

At block 1040, the unprovisioned battery-powered wireless sensors may receive network credentials from the user device, for example, a mobile phone, a tablet, a laptop computer, etc. The user device may transmit network credentials (e.g., communication channels used by the network, and encryption used by the network, etc.) to provision the unprovisioned battery-powered wireless sensors. The battery-powered wireless sensors may receive and store the network credentials.

At block 1045, the battery-powered wireless sensors may power down the Bluetooth radios. After receiving the network credentials, the battery-powered wireless sensors are capable of communicating with the network over the sub-gigahertz communication channels used by the network of the lighting control system. The sensors may power down the Bluetooth radios. Communication with the lighting control network may be performed using the sub-gigahertz communication channels and encryption, if any, specified in the network credentials. The sub-gigahertz radios, which were activated upon wake-up of the sensors, may remain operational.

At block 1050, the battery-powered wireless sensors may receive additional settings from the continuously powered device via the sub-gigahertz radios. Since the sub-gigahertz radios may remain active for a specified period of time after the battery-powered wireless sensors are awakened, the sensors may monitor the sub-gigahertz communication channels for additional settings messages from the continually powered device. Configuration settings, for example, occupancy or daylight sensor sensitivity, reporting (wake-up) intervals, changes to network features or parameters, etc., may be transmitted to the newly provisioned battery-powered wireless sensors by the continuously powered device via the sub-gigahertz communication channels used by the network of the lighting control system.

At block 1055, the battery-powered wireless sensors may resume operation in reduced power mode. Upon expiration of the specified time for keeping the sub-gigahertz radios operational, the battery-powered wireless sensors may power down the sub-gigahertz radios and resume operation in the reduced power mode with the occupancy sensors and/or daylight sensors operational.

The method 1000 may be embodied on a non-transitory computer readable medium known to those of skill in the art, having stored therein a program including computer executable instructions for making a processor, computer, or other programmable device execute the operations of the method.

It should be appreciated that the specific steps illustrated in FIG. 10 provide a particular method for waking up an unprovisioned battery-powered wireless sensor for a lighting control system according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Many variations, modifications, and alternatives may be recognize without departing from the scope of the present disclosure.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for configuring a wireless sensor of a lighting control network, the method comprising:
   providing, by a user, a sensor stimulus to cause the wireless sensor to wake-up from a reduced power operating mode, wherein in the reduced power operating mode a first radio configured to communicate using a first wireless communication protocol and a second radio configured to communicate using a second wireless communication protocol are inoperative, and wherein the first radio becomes operative upon the wake-up;
   receiving, via the first radio of the wireless sensor, an activation message from a control device, wherein the activation message causes the wireless sensor to maintain operation of the first radio for a first specified period of time; and
   resuming, by the wireless sensor, operation in the reduced power operating mode after the first specified period of time,
   wherein the wireless sensor is a battery-powered wireless sensor.

2. The method of claim 1, further comprising:
   receiving, via the first radio of the wireless sensor, configuration settings for the wireless sensor during the first specified period of time.

3. The method of claim 1, wherein the sensor stimulus is motion detected by an occupancy sensor of the wireless sensor, and
   wherein the motion is caused by a user moving in a detection field of the occupancy sensor.

4. The method of claim 1, wherein the sensor stimulus is a change in intensity level of light detected by a daylight sensor, and
   wherein the change in the intensity level of light is caused by a user aiming a light-emitting device at the daylight sensor.

5. The method of claim 1, wherein the control device is a continuously powered wall station, and
   wherein transmission of the activation message to the wireless sensor is initiated by user input to a user interface of the continuously powered wall station.

6. The method of claim 1, wherein the control device is a continuously powered sensor, and
   wherein transmission of the activation message to the wireless sensor is initiated by a command transmitted to the continuously powered sensor from a user device.

7. The method of claim 1, wherein the activation message is an indication included in an acknowledgement message received from the control device in response to a status message transmitted by the wireless sensor, or a message received from the control device in addition to an acknowledgement message received in response to a status message transmitted by the wireless sensor.

8. The method of claim 1, wherein the activation message is a message received over a specified number of communication channels for the first radio of the wireless sensor.

9. The method of claim 1, wherein the activation message includes an instruction to cause the wireless sensor to activate the second radio for a second specified period of time,
   wherein the second specified period of time is shorter than the first specified period of time.

10. The method of claim 9, further comprising:
    receiving, via the second radio, network settings for use by the wireless sensor to communicate on the lighting control network; and
    receiving, via the first radio, configuration settings for the wireless sensor,
    wherein the network settings are received from a user device prior to receiving the configuration settings for the wireless sensor.

11. The method of claim 1, wherein the first wireless protocol and the second wireless protocol are the same wireless communication protocol.

12. A lighting control network, comprising:
    a battery-powered wireless sensor configured to sense occupancy or light intensity level in a space; and
    a continuously powered control device in communication with the battery-powered wireless sensor,
    wherein the battery-powered wireless sensor is configured to:
       wake-up from a reduced power operating mode, wherein in the reduced power operating mode, a first radio configured to communicate using a first wireless communication protocol and a second radio configured to communicate using a second wireless communication protocol are inoperative, and wherein the first radio becomes operative upon the wake-up;
       receive, via the first radio, an activation message from the continuously powered control device, wherein the activation message causes the battery-powered wireless sensor to maintain operation of the first radio for a first specified period of time; and resume operation in the reduced power operating mode after the first specified period of time.

13. The lighting control network of claim 12, wherein the battery-powered wireless sensor is configured to:

receive, via the first radio, configuration settings for the battery-powered wireless sensor during the first specified period of time.

14. The lighting control network of claim 12, wherein the battery-powered wireless sensor is configured to wake-up in response to a sensor stimulus provided by a user.

15. The lighting control network, of claim 14, wherein the sensor stimulus is motion detected by an occupancy sensor of the battery-powered wireless sensor, and wherein the motion is caused by a user moving in a detection field of the occupancy sensor.

16. The lighting control network of claim 14, wherein the sensor stimulus is a change in intensity level of light detected by a daylight sensor, and wherein the change in the intensity level of light is caused by a user aiming a light-emitting device at the daylight sensor.

17. The lighting control network of claim 12, wherein the battery-powered wireless sensor is configured to wake-up upon expiration of a specified time interval.

18. The lighting control network of claim 12, wherein the continuously powered control device is a continuously powered wall station, and wherein transmission of the activation message to the battery-powered wireless sensor is initiated by input to a user interface of the continuously powered wall station.

19. The lighting control network of claim 12, wherein the continuously powered control device is a continuously powered sensor, and wherein transmission of the activation message to the battery-powered wireless sensor is initiated by a command transmitted to the continuously powered sensor from a user device.

20. The lighting control network of claim 12, wherein the activation message is an indication included in an acknowledgement message received from the continuously powered control device in response to a status message transmitted by the battery-powered wireless sensor, or a message received from the continuously powered control device in addition to an acknowledgement message received in response to a status message transmitted by the battery-powered wireless sensor.

21. The lighting control network of claim 12, wherein the activation message is a message received over a specified number of communication channels for the first radio of the battery-powered wireless sensor.

22. The lighting control network of claim 12, wherein the activation message includes an instruction to cause the battery-powered wireless sensor to activate the second radio for a second specified period of time, wherein the second specified period of time is shorter than the first specified period of time.

23. The lighting control network of claim 22, wherein the battery-powered wireless sensor is further configured to:

receive, via the second radio, network settings for use by the battery-powered wireless sensor to communicate on the lighting control network; and receive, via the first radio, configuration settings for the battery-powered wireless sensor, wherein the network settings are received from a user device prior to receiving the configuration settings for the battery-powered wireless sensor.

24. The lighting control network of claim 12, wherein the first wireless protocol and the second wireless communication protocol are the same wireless communication protocol.

* * * * *